United States Patent [19]
Quan et al.

[11] Patent Number: 6,041,028
[45] Date of Patent: *Mar. 21, 2000

[54] DYNAMIC ADJUSTMENT OF DISK-DRIVE PICKUP SIGNALS

[75] Inventors: Thomas A. Quan, Mt. View; John L. Grimsley, Los Altos, both of Calif.

[73] Assignee: Oak Technology, Inc., Sunnyvale, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/917,582

[22] Filed: Aug. 22, 1997

Related U.S. Application Data

[60] Provisional application No. 60/043,495, Apr. 11, 1997.

[51] Int. Cl.[7] .................................................. G11B 7/00
[52] U.S. Cl. .................................. 369/44.34; 369/44.28; 369/59; 369/124
[58] Field of Search ........................... 369/44.28, 44.27, 369/44.29, 44.34, 44.36, 44.41, 47, 50, 59, 124

[56] References Cited

U.S. PATENT DOCUMENTS

| | | | |
|---|---|---|---|
| 5,043,966 | 8/1991 | Zwaans | 369/47 |
| 5,247,501 | 9/1993 | Hashimoto et al. | 369/44.11 |
| 5,289,447 | 2/1994 | Kobayashi et al. | 369/44.28 |
| 5,291,466 | 3/1994 | Kwak | 369/44.35 |
| 5,293,369 | 3/1994 | Melas et al. | 369/59 |
| 5,590,103 | 12/1996 | Noda | 369/44.29 |

FOREIGN PATENT DOCUMENTS

| | | |
|---|---|---|
| 0408310 | 1/1991 | European Pat. Off. . |
| 0459606 | 12/1991 | European Pat. Off. . |
| 0502713 | 9/1992 | European Pat. Off. . |
| 0514773 | 11/1992 | European Pat. Off. . |
| 2544117 | 10/1984 | France . |

*Primary Examiner*—Muhammad N. Edun
*Attorney, Agent, or Firm*—Townsend and Townsend and Crew LLP

[57] ABSTRACT

Adjustment of disc-drive pickup signals in a manner that responds dynamically to changes in such signals while in use. Adjustment is directed toward achieving an approximately symmetric (i.e., 50-50) duty cycle. A variable integration rate of symmetry error responds to fluctuations in pickup signal frequency to achieve more accurate adjustment of quadrature track crossing signals during a search operation.

20 Claims, 15 Drawing Sheets

FIG. 13B  FULL-TRACK LOGIC

DYNAMIC ADJUSTMENT OF DISK-DRIVE PICKUP SIGNALS

CROSS-REFERENCES TO RELATED APPLICATIONS

This application claims priority from copending U.S. Provisional Application No. 60/043,495, filed Apr. 11, 1997 (inventors: Thomas A. Quan and John L. Grimsley), entitled "Proportional Sampling Circuit for Auto-Adjustment of CD-ROM Pickup Signals," and which is hereby incorporated by references in its entirety for all purposes.

Additionally, copending U.S. patent application Ser. No. 08/834,607 filed Apr. 14, 1997 (inventor: John L. Grimsley), entitled "Runout Calibration for Disc Drive System" is hereby incorporated by reference in its entirety for all purposes.

BACKGROUND OF THE INVENTION

The present invention relates generally to the field of disc-drive data storage systems and, in particular, to track search capability within such systems.

The term "disc-drive systems" (or "disk-drive systems") is directed to any system (e.g., optical, magnetic, etc.) that accesses data held on a rotating disc. Optical disc-drive systems include read-only compact discs (CD), digital versatile discs (DVD) and digital videodiscs (DVD), as well as their writable counterparts (e.g., CD-R, CD-RW, DVD-R and DVD-RAM). In such systems, information is read from and/or written to a disc by a transducing head or "pickup" supported adjacent the disc surface. Among the most common of these optical systems is CD-ROM.

CD-ROMs store data in a single, spiral track (analogous to a phonograph record) that circumnavigates the disc thousands of times (e.g., over 20,000) as it gradually moves away from the center of the disc. For ease of discussion, each rotation of this single, spiral track is referred to herein as a track. The architecture and operation of CD-ROM drive systems are well-known by those having ordinary skill in the art, and a description of such systems may be found in C. Sherman, *CD-ROM Handbook*, Intertext Publications McGraw-Hill, Inc. (1994), which is hereby incorporated by reference in its entirety for all purposes.

In conventional CD-ROM drive systems, CD-ROMs are "read" with a laser beam emitted from an optical pickup suspended beneath the disc. The disc reflects the emitted beam back towards the pickup which contains photodiodes to detect the intensity of the reflected beam (modified by surface irregularities on the disc). The reflected beam conveys both data and tracking information.

A conventional CD-ROM drive system typically includes a positioning servo loop or, more generally, a servo system (containing one or more servo loops) to position and maintain the pickup precisely over a selected track of the disc. The operation of maintaining the pickup over a desired track is referred to as "track following". The operation of positioning the pickup over a destination or target track by laterally moving the pickup across one or more tracks is referred to as a track "search" or "seek."

In a track search operation, pickup position relative to the disc is determined by monitoring the number of tracks crossed over (i.e., "track crossings") as the pickup moves from a starting track to a destination track. This monitoring is performed by the photodiodes of the pickup.

FIG. 1 illustrates an exemplary layout of photodiodes within an optical pickup 100. As shown in this figure, four photodiodes 102–108 (which generate signals A, B, C and D, respectively) are clustered together at the center and two photodiodes 110, 112 (which generate signals E and F, respectively) are staggered diagonally on the periphery. During a track search, this array of six photodiodes moves in a direction shown by arrow 114, which is perpendicular to track orientation arrow 116 (approximating track orientation on an optical disc).

The diode arrangement of FIG. 1 is configured to facilitate a "three-beam" laser operation, which is well known to those having ordinary skill in the art. In such operation, a single laser beam generated within the disc drive system passes through a diffraction grating plate to produce two small side beams (e.g., side beams 370 and 372 of FIG. 5) on either side of a single main beam (e.g., main beam 330 of FIG. 5). All three beams are then emitted from a pickup onto a rotating disc, which reflects the beams back to photodiodes disposed within the pickup. This three-beam operation is commonly used in CD-ROM drive systems as well as CD audio systems.

During conventional three-beam operation, the main beam is reflected off a rotating disc and detected by diodes 102–108. The signals generated by these diodes may be summed together (producing signal "A+B+C+D") through techniques well-known to those having ordinary skill in the art. The resulting signal oscillates in conjunction with track crossings during a track search.

Further, each periphery diode 110, 112 detects one of the side beams reflected off the rotating disc (each slightly off track). The signals generated by these diodes are subtracted from each other (producing signal "E−F") again through techniques well-known to those having ordinary skill in the art. The resulting signal also oscillates in conjunction with track crossings. Accordingly, during a track search, signals A+B+C+D and E−F function as track-crossing signals representing pickup movement across one or more tracks.

In a conventional track search, pickup 100 crosses tracks of an optical disc by moving along the radius of the disc in the direction of arrow 114. During this process, signals A+B+C+D and E−F ideally result in sine waves 90° out of phase from each other, oscillating about a reference voltage "$V_{ref}$" as shown by waveforms 202 and 204 in FIG. 2A. $V_{ref}$ is typically ground or an offset ground in a single power supply system.

The physical relationship of signal E−F with optical disc tracks is shown schematically in FIG. 2B. Referring to this figure, E−F 204 crosses a level zero 220 (i.e., $V_{ref}$) at the center of tracks 210 and 212. As shown therein, the period "T" of E−F 204 represents the crossing of one track width or pitch (e.g., 1.6 μm).

Ideally, signals 202 and 204 should have a 50-50 duty cycle, which contributes to more accurate detection of track crossings. Signals 202 and 204 of FIG. 2A are shown in this ideal state; i.e., they are above level zero 220 for about one half of their period and below this level for the other half (thereby representing a symmetric or 50-50 duty cycle).

However, in practice, this 50-50 duty cycle may not initially be achieved due to an unwanted DC bias on the subject analog signal (i.e., A+B+C+D and/or E−F) which creates an offset from symmetric operation. As is well known, this unwanted bias may be substantially nullified by applying a correction voltage or bias to the subject signal.

Referring to FIG. 3, a sinewave 402 (representing E−F in this example) is subject to an offset 406 from $V_{ref}$. In accordance with conventional methods, this offset is determined by peak detecting the top and bottom of wave 402.

Since signals from photodiodes and preamplifiers are noisy, average top and bottom peak values are calculated over a relatively large number of periods (i.e., "T" of FIG. 4) of the subject wave. Typically, the peaks of thirty-two or sixty-four full sinewaves (generated over thirty-two or sixty-four periods, respectively) are measured to obtain the necessary values for calculating the offset. Once calculated, a correction bias 404 is adjusted to produce a new correction bias 404', which compensates for the undesired offset 406. The corrected wave 402'achieves an approximate 50-50 duty cycle about $V_{ref}$.

The foregoing conventional method requires considerable time (i.e., 32 or 64 sinewave periods) to collect the required samples for averaging peak values. As such, this method has an inherent latency that is problematic when performing a track search operation since undesired offsets of A+B+C+D and/or E−F typically undergo rapid change during such searches.

Moreover, the foregoing conventional method is typically applied only once at spin-up calibration (i.e., during power up of a disc-drive system). However, optical pickup signals such as RFRP and TE have been observed to gradually deteriorate during the course of a track search when the pickup is in motion. As such, an initially-applied correction bias may be gradually rendered ineffective over the life of a single search.

Additionally, the conventional method is highly sensitive to sinewaves A+B+C+D and E−F being clipped or similarly distorted since an accurate offset can only be determined from accurate peak values.

Further, the conventional method produces a correction signal that is applied in its entirety at one time. If the offset is large, a comparable correction signal can introduce large transients into the servo loop used for tracking operations which may cause tracking reliability problems.

Thus, it would be desirable to correct for undesired offsets introduced into analog signals such as RFRP and TE in a manner that could respond dynamically to changes in the offset value during the course of a track search, be relatively insensitive to clipping or similar distortions of the analog signals and could introduce such correction gradually.

SUMMARY OF THE INVENTION

The invention provides method and apparatus for adjusting disc-drive pickup signals such as RFRP and TE in a manner that responds dynamically to changes in unwanted offsets during the course of a track search, provides for gradual elimination of such offsets and is relatively insensitive to clipping or similar distortions, including crossing noise, of the analog signals.

In an exemplary embodiment, a circuit is provided which includes a summing junction that receives a first signal and a comparator that generates a second signal having a variable period based upon the first signal. The circuit further includes a first up-down counter whose count direction is controlled by the second signal and which generates a correction bias signal. Also included is a proportional sampler that provides a variable sampling strobe to the first up-down counter, wherein the sampling strobe is operable to adjust the frequency of count operation in the first up-down counter based upon achieving a desired number of counts within approximately the variable period. Finally, the circuit includes a feedback loop for returning the correction bias signal to the summing junction.

In one aspect, the second signal has a variable duty cycle and the correction bias signal is dependent upon such duty cycle.

Another aspect involves coupling a multi-clock generator to the proportional sampler. In yet another aspect, the proportional sampler includes a multiplexer coupled to the multi-clock generator for selecting and outputting the sampling strobe. In a further aspect, the proportional sampler also includes a counter that receives the sampling strobe and generates a terminal count signal upon reaching the desired number of counts, a flip-flop coupled to the counter which records the terminal count when received at or before completion of approximately the variable period and a second up-down counter that generates a selection signal based upon flip-flop contents, the selection signal being used to control the multiplexer.

In another embodiment, a disc drive system is provided that includes a first plurality of sensors whose output is combined to form a first track-crossing signal representative of movement across one or more tracks of a disc, and a first comparator for receiving the first track-crossing signal and creating a first oscillating signal. The system also includes a first up-down counter whose count direction is controlled by the first oscillating signal and which generates a first correction bias signal. A proportional sampler, which is also included in the system, provides a sampling strobe to the first up-down counter. The sampling strobe is operable to adjust the frequency of count operations in the first up-down counter based upon achieving a desired number of counts within a single full-track crossing.

In one aspect, the disc-drive system also includes a summing junction disposed between the first plurality of sensors and the first comparator, and a first feedback loop for returning the first correction bias signal to the summing junction.

In another aspect, the disc-drive system includes a second plurality of sensors, a second signal processing circuit coupled to the second plurality of sensors for generating a second track-crossing signal and a second comparator for creating a second oscillating signal. In this aspect, the disc-drive system further includes another up-down counter whose count direction is controlled by the second oscillating control signal and whose frequency of count operations is controlled by the sampling strobe. This other up-down counter generates a second correction bias signal which is returned to the signal processing circuit via a second feedback loop.

In yet another embodiment, a method for dynamically adjusting a disc-drive pickup signal having a variable frequency including the steps of receiving the pickup signal, incrementing a count value according to a sampling frequency while the pickup signal is above a predetermined threshold value, decrementing the count value according to the sampling frequency while the pickup signal is below the predetermined threshold value, periodically adjusting the sampling frequency based upon the variable frequency, converting the count value to a correction bias signal, and modifying the pickup signal using the correction bias signal.

The foregoing is useful for improving the reliability of disc-drive searches (such as CD-ROMs) over a large number of tracks. For example, conventional CD-ROM drives typically have maximum fine searches of 255 tracks. However, by applying the apparatus and method described herein, fine searches of 2047 tracks have been made in CD-ROM drives.

A further understanding of the nature and advantages of the invention may be realized by reference to the remaining portions of the specification and the drawings.

BRIEF DESCRIPTION OF THE DRAWINGS

FIGS. 13A and 13B are diagrams illustrating composition and operation of full-track logic disposed within the proportional sampler of FIG. 12.

DETAILED DESCRIPTION OF THE SPECIFIC EMBODIMENTS

Although the following discussion is directed primarily to CD-ROM drive systems, it would be understood by one having ordinary skill in the art that the invention described herein is applicable to a variety of disc-drive systems including optical or magnetic systems.

Figure 5:
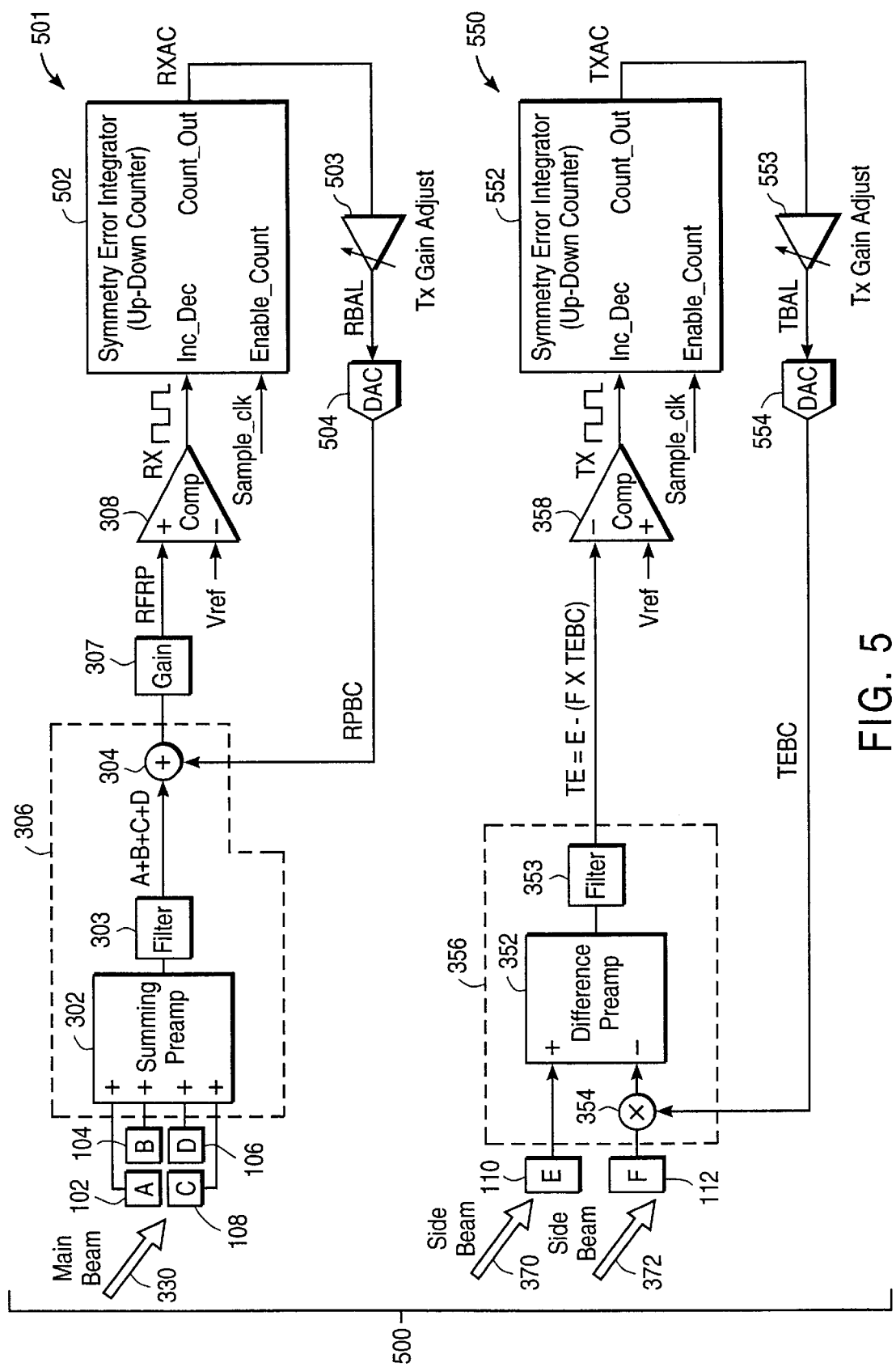
FIG. 5 is a block diagram of system architecture for dynamically adjusting disc-drive pickup signals in accordance with the invention.

FIG. 5 illustrates a first embodiment of the present invention in the form of a system architecture 500, disposed within a conventional CD-ROM drive system (the "host CD-ROM drive system," not shown) and used to process pickup signals. System 500 includes component systems 501 and 550 which process signals from photodiodes 102–108 and 110–112, respectively. These photodiodes are configured within an optical pickup, such as pickup 100 of FIG. 1, and used to "read" an optical disc in accordance with the "three-beam" laser operation described above.

More specifically, system 501 contains photodiodes 102–108 coupled to a signal processing circuit 306 which is, in turn, coupled to a comparator 308 through gain circuitry 307. Circuit 306 includes a summing preamplifier 302, a low-pass filter 303 (for removing high-frequency data modulation components) and a summing junction 304. Preamplifier 302 sums the signals generated by photodiodes 102–108. The resulting summation (i.e., signal A+B+C+D) passes through filter 303, which strips signal A+B+C+D of its high-frequency components, and is received by summing junction 304.

A second input to junction 304 is a correction bias (e.g., Ripple Balance Correction or RPBC) generated by a digital-to-analog converter (DAC) 504. In accordance with the invention, signal RPBC is applied to junction 304 to adjust for any unwanted offset that may be present in filtered signal A+B+C+D. The output of junction 304 passes through conventional gain circuitry 307, which may be used to adjust the peak-to-peak amplitude and, if desired, the DC level of this signal to approximate that of a particular signal in system 550; namely, Tracking Error signal (TE).

The output of gain circuitry 307 is an analog signal identified as radio frequency ripple (RFRP). During operation of the host CD-ROM drive system while diodes 102–108 move laterally over an optical disc in performing a track "search," RFRP will oscillate in conjunction with track crossings (like signal A+B+C+D). Referring again to FIG. 5, RFRP is forwarded to comparator 308 where it is compared with a reference voltage $V_{ref}$ (typically ground or an offset ground in a single power supply system). The output of comparator 308 is a square wave RX, described below.

This system also includes a Symmetry Error Integrator 502 coupled to the output of comparator 308. Integrator 502 is further coupled to RX Gain Adjust 503 which is, in turn, coupled to Digital to Analog Convertor (DAC) 504. As noted above, the output of DAC 504 is fed into junction 304 thereby creating a feedback loop. In a preferred embodiment, integrator 502 is an up-down counter.

System 550 contains photodiodes 110, 112 coupled to a signal processing circuit 356 which is, in turn, coupled to a comparator 358. Circuit 356 includes a multiplying junction 354, a difference preamplifier 352 and a low-pass filter 353 (for removing a high-frequency data modulation component). Circuit 356 may be configured in any conventional design well-known to those having ordinary skill in the art. The output of circuit 356 is an analog signal identified as Tracking Error (TE). Like RFRP, during a track search by the host CD-ROM drive system, TE will oscillate in conjunction with track crossings. Accordingly, during such track searches, both RFRP and TE function as track-crossing signals representing pickup movement across one or more tracks. Further, as is well known in the art, signal TE may be tapped to control the radial positioning of a pickup, such as pickup 100, to keep main beam 330 on track during track following operations.

Inputs to multiplying junction 354 are coupled to a DAC 554 and photodiode 112, and an output to this junction is coupled to preamplifier 352. Junction 354 modifies signal "F" with a correction bias (e.g., Tracking Error Balance Correction or TEBC) from DAC 554 that adjusts for any unwanted offset in TE. Modified signal F and the output from photodiode 110 (i.e., signal "E") are subtracted from each other in preamplifier 352. The resulting difference signal (i.e., E-(FxTEBC)) passes through filter 353, which strips the signal of its high-frequency components, and is received by comparator 358. Using a reference voltage $V_{ref}$ (typically ground or an offset ground in a single power supply system), comparator 358 converts the signal output from filter 353 to a square wave TX, described below.

System 550 also includes a Symmetry Error Integrator 552 coupled to comparator 358. Integrator 552 is further coupled to TX Gain Adjust 553 which is, in turn, coupled to DAC 554. The output of DAC 554 is fed into junction 354 thereby creating a feedback loop. In a preferred embodiment, integrator 552 is an up-down counter.

Low-pass filters 303 and 353 may be configured with any characteristics deemed appropriate for a particular circuit design to strip off unwanted high-frequency data and noise components. However, in a preferred embodiment, these filters are identical to each other and have characteristics that avoid excessive attenuation or phase shift to the filtered signals at the lowest servo frequency of interest. It is preferred that these filters provide for proper operation with relatively high-frequency signals, since operating the host CD-ROM Drive system at a faster speed in an attempt to achieve faster track searches increases the frequency of RFRP and TE.

Conventional CD-ROM Drive systems utilize "run-length limited (2,10)" encoding, which prohibits less than two zeros and more than ten zeros from being encoded between two ones on a CD ROM. This means that the operating frequency range of a CD-ROM Drive system utilizing the current standard is from 3T to 11T, where T is the period associated with the channel bit rate associated with the CD-ROM Drive operating speed.

TABLE 1

| Period & Frequency | 1X Speed | 2X Speed | 8X Speed | 16X Speed |
|---|---|---|---|---|
| 11T (ns) | 2545.236 | 1272.618 | 318.1545 | 159.0772 |
| Min Freq. (Mhz) | 0.196445 | 0.392891 | 1.571564 | 3.143127 |
| 3T (ns) | 694.1552 | 347.0776 | 86.7694 | 43.3847 |
| Max Freq. (Mhz) | 0.7203 | 1.4406 | 5.7624 | 11.5248 |

Referring to Table 1, a 1X speed operation for a conventional CD-ROM Drive system results in a 3T period of about 694 ns and an 11T period of about 2545 ns. As noted above, it is desired to select the characteristics of low-pass filters 303 and 353 such that the lowest frequency of the operation is considered. Thus, for a 1x speed, the minimum frequency associated with the maximum period of 11T is approximately 196 kHz. As such, low-pass filters 303 and 353 employed in such a system should have characteristics that introduce sufficient attenuation to the signals operating at that lowest data frequency of interest.

Accordingly, in an embodiment of system 500 employed in a host CD-ROM Drive system having the characteristics of Table 1, low-pass filters 303 and 353 may be second order filters having cut-off frequencies of approximately 60 kHz, which provide approximately 20dB attenuation at 196 kHz (the lowest signal frequency of interest in the system of Table 1).

In an alternative embodiment, low-pass filters 303 and 353 may have a cut-off frequency of approximately 100 kHz or higher, allowing faster seek times. In this embodiment, the operating speed of the host CD-ROM Drive system should be operating at a higher disc speed (e.g., 2x or higher in the system of Table 1). Alternatively, 60 kHz filters may be used at lower CD speeds.

Figure 1:
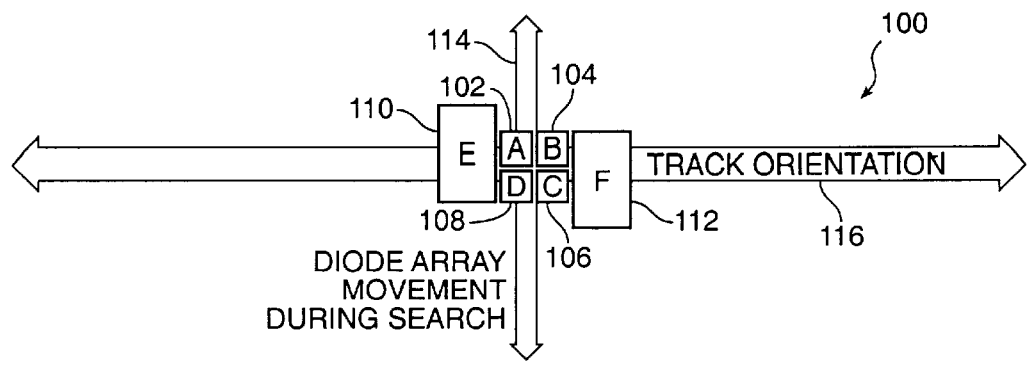
FIG. 1 is a layout diagram of photodiodes within a conventional optical pickup.

As described above, system 500 is disposed within a host CD-ROM Drive system using conventional three-beam operation and configured with a pickup, such as pickup 100, containing photodiodes 102–112 (FIG. 1). Referring to FIG. 5, photodiodes 102–108 receive main beam 330 and photodiodes 110 and 112 receive side beams 370 and 372, respectively, in accordance with conventional three-beam operation. As described above, diodes 102–108 and 110–112 generate signals that are processed to become RFRP and TE, respectively. As also noted above, these signals oscillate in conjunction with track crossings during a track search and therefore function as track-crossing signals representing pickup movement across one or more tracks.

Figure 2A:
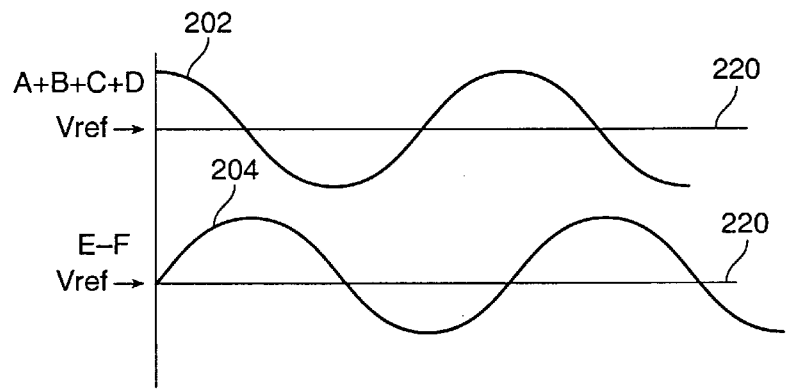
FIG. 2A is a diagram illustrating the relationship between track-crossing signals A+B+C+D and E–F.
Figure 2B:
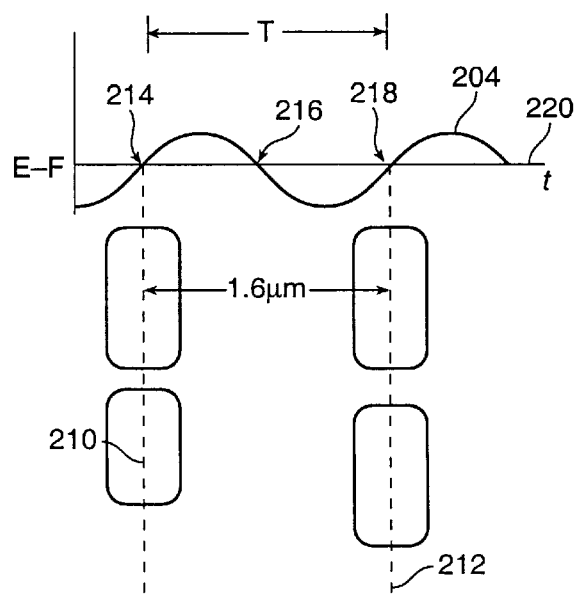
FIG. 2B is a diagram illustrating the relationship between a track-crossing signal and tracks on an optical disc.
Figure 3:
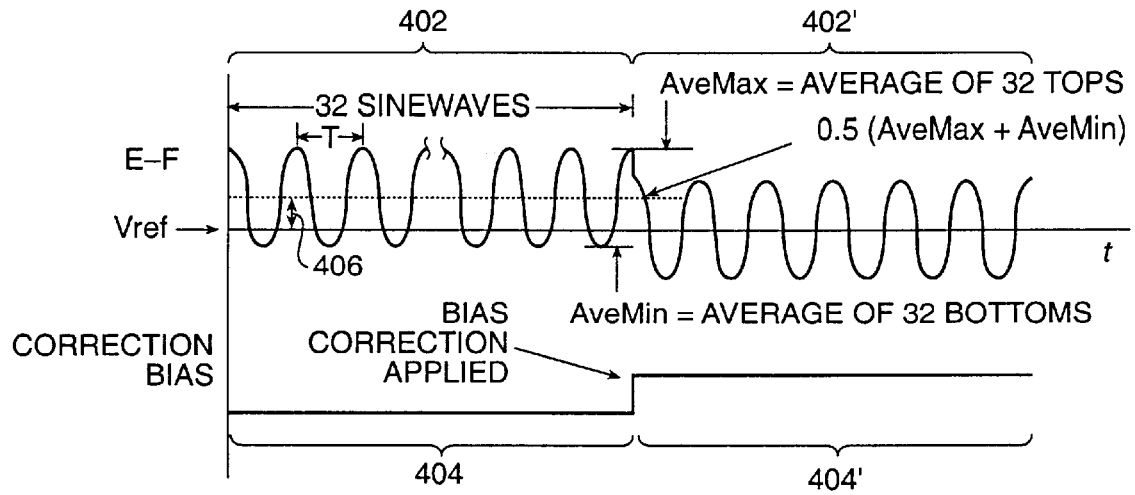
FIG. 3 is a diagram illustrating a prior-art method for adjusting track-crossing signals.
Figure 4:
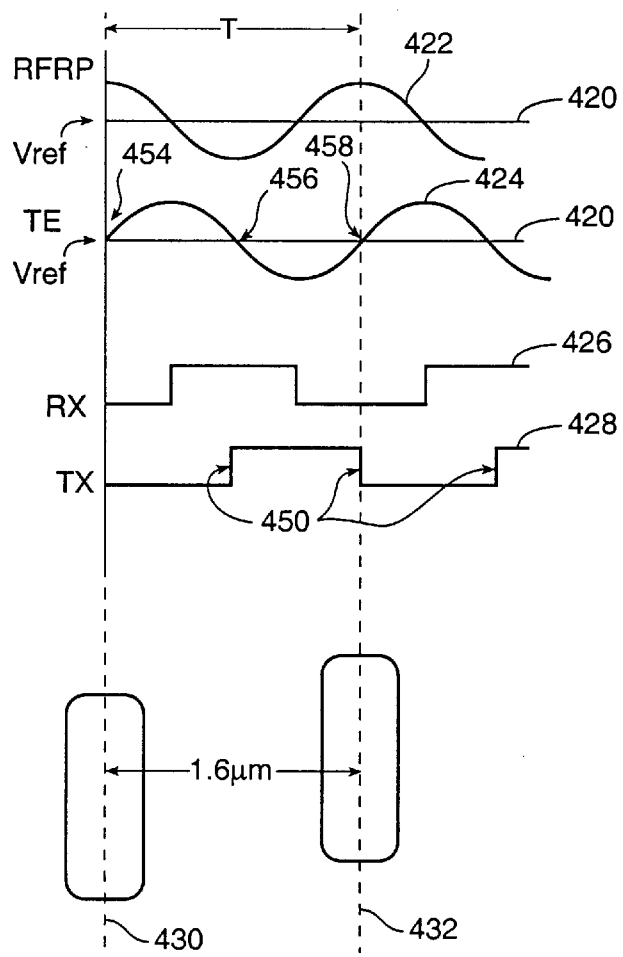
FIG. 4 is a diagram illustrating the relationship among various track-crossing signals in accordance with the invention.

In a conventional track search, pickup 100 crosses tracks of an optical disc by moving along the radius of the disc in the direction of arrow 114 (FIG. 1). During this process, signals RFRP and TE (like A+B+C+D and E–F of FIG. 2A) result in sinewaves approximately 90° out of phase from each other (i.e., quadrature in phase), as shown in FIG. 4. To facilitate processing, RFRP is thresholded by comparator 308 (FIG. 5) to produce square wave RX. Similarly, TE is thresholded by comparator 358 to produce square wave TX. The phase of RX in view of TX (i.e., approximately 90° ahead or behind) indicates direction of a search, as discussed below.

The physical relationship of signal TE with optical disc tracks is shown schematically in FIG. 4. Referring to FIG. 4, TE 424 crosses a level zero 420 (i.e., $V_{ref}$) at the center of tracks 430 and 432. As shown therein, the period "T" of TE 424 represents the crossing of one track width or pitch (e.g., 1.6 $\mu$m). Each crossing of level zero by TE corresponds to a change in state by TX, which is referred to as a half-track pulse 450. Accordingly, starting at point 454 of TE 424 (and not counting the "half-track pulse" created at this point), the generation of two half-track pulses 450 occurring at points 456 and 458 will represent the traversal of a single track on a disc by pickup 100.

Ideally, both digital signals RX and TX should have a 50-50 duty cycle. This contributes to, among other things, more accurate detection of track crossings and a greater likelihood that a quadrature phase relationship between RX and TX can be maintained. Such overlapping relationship is used to determine direction of a track search, as discussed below. Signals 422 and 424 of FIG. 4 are shown in this ideal state; i.e., they are above level zero 420 for about one half of their period and below this level for the other half (thereby representing a symmetric or 50-50 duty cycle).

In practice, this 50-50 duty cycle may not initially be achieved due to an unwanted DC bias on the subject analog signal (i.e., RFRP and/or TE) which creates an offset from symmetric operations. In accordance with system 500 of FIG. 5, such unwanted bias may be substantially nullified by applying a correction bias (i.e., RPBC and/or TEBC) to the subject signal.

In system 500, RPBC voltage may be positive or negative depending upon whether an unwanted bias lowers or raises the subject signal below or above a fixed reference voltage (e.g., $V_{ref}$) and thereby creates a nonsymmetric duty cycle. Alternatively, signal TEBC may be less than one or greater than one (i.e., typically forming a range of about 0.5 to about 2.0) depending upon whether an unwanted bias lowers or raises the subject signal below or above a fixed reference voltage (e.g., $V_{ref}$) and thereby creates a nonsymmetric duty cycle.

Systems 501 and 550 dynamically generate correction bias for each individual RFRP and TE sinewave based upon the duty cycle of RX and TX, respectively. These systems use Symmetry Error Integrators 502 and 552 to integrate symmetry error present in the RX and TX duty cycles, respectively. Such integration is applied to junction 304 via DAC 504 as a closed-loop correction bias. Similarly, such integration is applied to junction 354 via DAC 554 as a closed-loop correction bias. Each full RX or TX squarewave is sampled at a sampling frequency (via "Sample_clk") much higher than its fundamental frequency, thus providing enough resolution to generate a correction bias signal when symmetry is off. In one embodiment, the sampling frequency may be fixed (e.g., at about 352.8 kHz). More preferably, as described below, the sampling frequency may be variable (e.g., ranging from about 22 kHz to about 2.8 MHz). RX and TX frequencies are typically much lower; e.g., from about 1 kHz to about 120 kHz.

In operation, integrators 502 and 552 will count up when RX and TX, respectively, are sampled high. Conversely, these integrators will count down when RX and TX are sampled low. Accordingly, signals RX and TX function as control signals directing the operation of integrators 502 and 552, respectively. The outputs of integrators 502, 552 are continuously adjusted as described below.

An asymmetrical squarewave will have an uneven distribution of high and low periods. As such, integrators 502 and 552 will produce a net positive or negative count for each square wave period. On the other hand, a symmetrical wave will have an even distribution of high and low portions over a single period "T". As such, integrators 502 and 552 will produce a count at the end of a period that remains unchanged from a previous count of the immediately previous period.

Figure 6A:
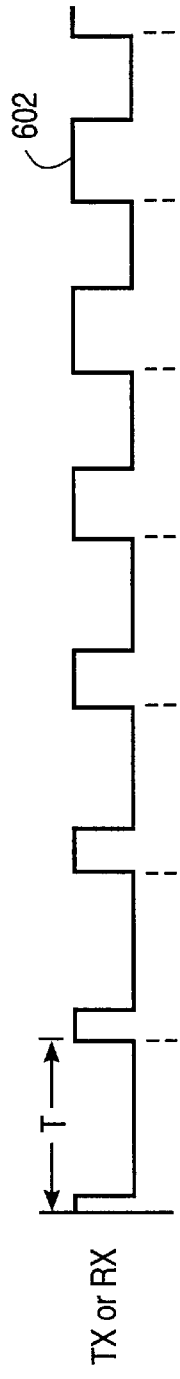
FIGS. 6A–6C graphically illustrate an asymmetric waveform becoming symmetric in accordance with the present invention.
Figure 6B:
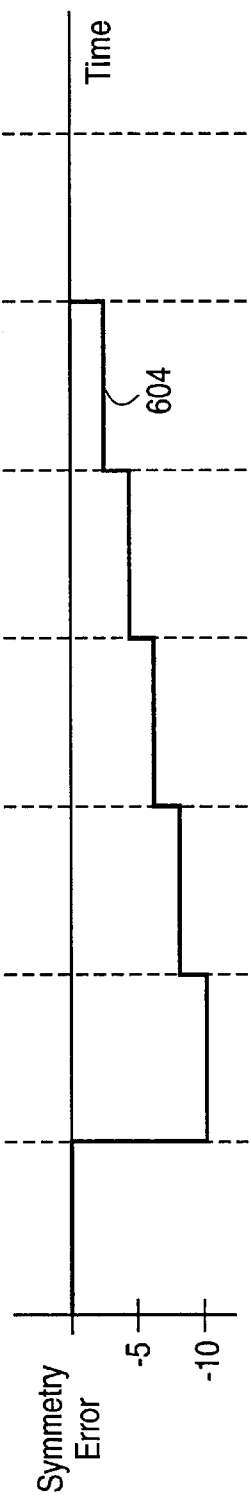
Figure 6C:
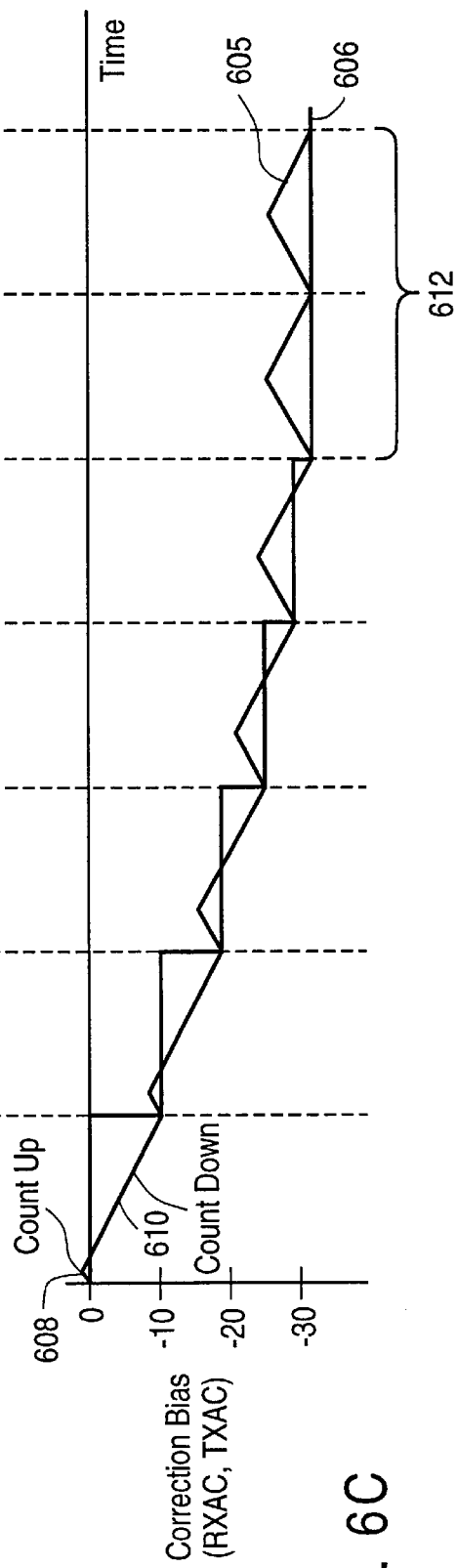

FIGS. 6A–6C graphically illustrate an asymmetric waveform 602 (TX or RX) becoming symmetric in accordance with the present invention. FIG. 6A shows the transformation of waveform 602 from asymmetric to symmetric proportions, FIG. 6B shows the symmetry error 604 of waveform 602 and FIG. 6C shows the correction bias generated by integrators (e.g., 502 or 552 of FIG. 5) to eliminate symmetry error 604. The correction bias of FIG. 6C is shown in two forms: continuously-adjusted output 605 superimposed over periodically-adjusted output 606. Each correction bias form, as described below, is dependent upon the count of integrators such as integrators 502 or 552.

When waveform 602 is high, an integrator (e.g., 502 or 552) counts up (e.g., 608) and when waveform 602 is low, the integrator counts down (e.g., 610). As the square wave 602 becomes more symmetric, the symmetry error 604 (FIG. 6B) decreases and the correction bias voltage, created by integrating the error, gradually levels off for each period T. The net change in the integrator for each period T becomes zero when the duty cycle of waveform 602 reaches 50% (i.e., region 612). Noisy signals are assumed to have as many false highs as false lows, so the average should be approximately zero. As such, this processing is relatively insensitive to any crossing noise of the analog signal from which waveform 602 is derived.

Referring to FIG. 5, digital correction bias signals RXAC and TXAC generated from integrators 502 and 552, respectively, are maintained to correct for any offset that is present in signals RFRP or TE. Adjustment of these signals may be either continuous or periodic. Continuous adjustment of signals RXAC and TXAC simply requires the immediate output of count values from integrators 502, 552 as they are generated. This results in an output with relatively continuous rises 608 and falls 610, as shown in line 605 of FIG. 6C. Alternatively, signals RXAC and TXAC may be periodically adjusted by delaying and triggering changes to RXAC and TXAC with transitions in signals RX and TX, respectively. This results in an output potentially having relatively discontinuous changes, as shown in line 606 of FIG. 6C.

As graphically illustrated by line 606, periodic adjustment applies the net result of a count for a given period to RXAC or TXAC at the end of the period. Referring to FIG. 5, such periodic operation would require additional logic coupled to the outputs of integrators 502, 552 to sum and hold the counts for each period. This logic is straight forward and need not be further described. Preferably, however, such logic is not used and the outputs of integrators 502, 552 are directly applied when generated (i.e., continuously adjusted) as correction bias in accordance with the embodiments of FIGS. 5 and 10.

Continuous adjustment is beneficial since it provides for changes to correction bias even when there is no RX or TX transition. This is particularly beneficial in the situation where RX or TX are grossly out of balance to the point where no transition is detected. Using periodic adjustment under such conditions, no modification to correction bias would occur and the loop would simply remain in its current condition. However, with continuous adjustment, there is at least the possibility that the gross offset experienced by RX or TX may be gradually corrected if the correction bias is moving in the proper direction. Any noise perceived to be added to the correction bias through the use of continuous adjustment (i.e., in the form of a triangle ramping up and down during each period T) appears to be insignificant and makes no practical difference in the final outcome.

Referring again to FIG. 5, RX Gain Adjust 503 and TX Gain Adjust 553 provide gain adjustment to RXAC and TXAC, respectively. In operation, Gain Adjust 503, 553 provide a coefficient that is multiplied with RXAC and TXAC, respectively, to control the variation of DAC 504, 554 output in response to each count generated by integrators 502, 552. The purpose of these gain adjusts are simply to prevent the corresponding DACs in systems 501 and 550 from being too sluggish (i.e., the change in DAC output is disproportionately small for each count) or too sensitive (i.e., the change in DAC output is disproportionately large for each count). As would be understood by one having ordinary skill in the art, the necessary coefficients for Gain Adjusts 503, 553 are design-specific and controlled at least in part by the characteristics of the individual components that make up systems 501 and 550.

In accordance with the embodiment of FIGS. 5 and 6, a 50-50 duty cycle is dynamically maintained for pickup signals in real time. This operation is relatively insensitive to the pickup sinewaves being clipped or similarly distorted since control is based upon duty cycle rather than peak values. Further, as illustrated in FIG. 6, correction bias is applied incrementally and is therefore less likely to introduce large transients into the servo loop used for tracking operations.

Figure 7:
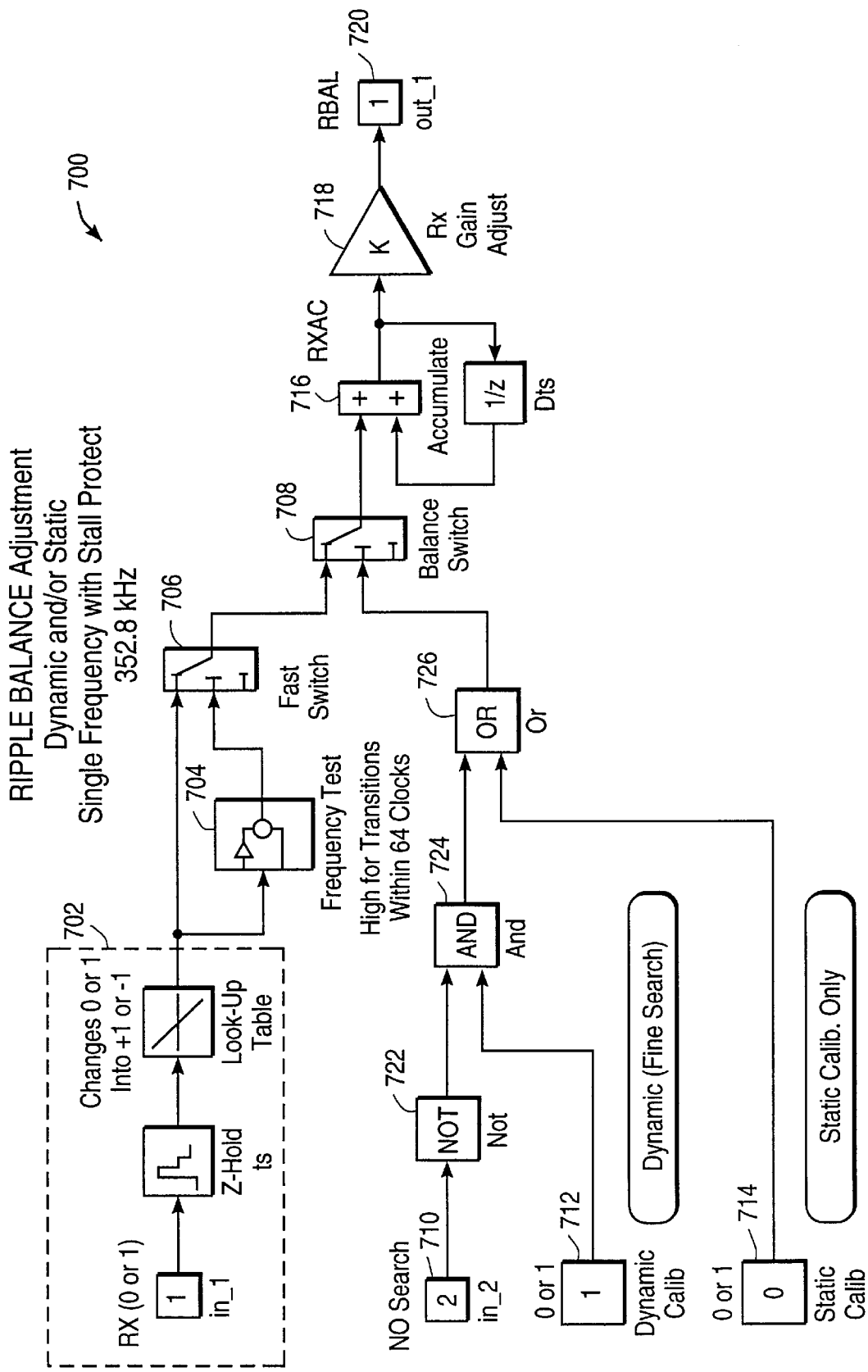
FIG. 7 is a diagram of a simulation of a system for dynamically adjusting disc-drive pickup signals in accordance with the invention.

FIG. 7 illustrates a simulation model utilizing dynamic adjustment of disc-drive pickup signals as described above. This model is based upon adjustment of the Ripple Balance Correction signal (RPBC) which, as shown in FIG. 5, is used to modify RFRP. This simulation specifies a dynamic "fine" search. In accordance with the discussion herein, a fine search may range from one to a few thousand tracks while a "rough" search may range from a few thousand to over twenty thousand tracks. Select elements and operations of FIG. 7 are described in Table 2.

TABLE 2

| Element(s) | Operation |
|---|---|
| Block 702 | Converts an RX wave oscillating between 0 and 5 volts to a simulation signal oscillating between +1 and −1, respectively. |
| Frequency Test 704 Fast Switch 706 | Frequency Test 704 identifies low-speed stalls. If no RX transition is detected over 64 clock cycles, a stall is presumed and a fast switch 706 is tied low prohibiting further output. Alternatively, if transitions are occurring within the 64 cycle interval, fast switch 706 outputs plus or minus ones in accordance with the value of RX at a specified frequency (e.g., 352.8 |
| Balance Switch 706 No Search 710 Dynamic Calib 712 Static Calib 714 | A switch controlled by "NO Search" 710 (active low signal; search enabled when 0) g "Dynamic Calib" 712 (signal controlled by a microprocessor (not shown) to enable dynamic adjustment) and "Static Calib" 714 (signal controlled by the microprocessor to enable static calibration). If the logical combination of these signals (as illustrated in FIG. 7) produces a logic one, Balance Switch 708 will allow output of Fast Switch 706 to pass to RXAC (RX accumulator) 716. Alternatively, if such logical combination produces a logic zero, Balance Switch 708 is tied low preventing output. |
| RXAC 716 | (RX Accumulator) When active, this block continues to sum positive or negative ones output by Fast Switch 706 (i.e., ±1) every clock cycle to produce a correction bias. |
| RX Gain Adjust 718 | Multiplier scaling function that converts the output of RXAC 716 to a value capable of being converted by a particular DAC to an appropriately proportional signal (e.g., RXAC may be converted into an eight-bit digital signal for conversion by an appropriate DAC). |
| Rbal 720 | Digital representation (signed integer number) of RPBC. Requires conversion by DAC to become RPBC (analog voltage). |
| Static Calib 714 | Provides for the generation of a static correction bias signal. As is well known, such signal is determined by placing a stationary optical pickup over a disc spinning at 1X rate (CD-ROM) thereby allowing the pickup to "cross" tracks due to runout. |
| Logic blocks 722–726 | Logic block 722 is a logic NOT (inverter), block 724 is a logic AND and block 726 is a logic OR. |

Figure 8A:
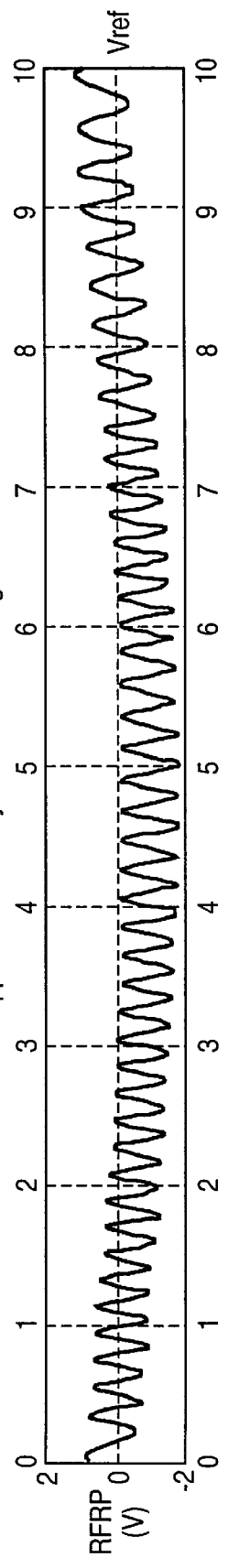
FIGS. 8A–8c are simulation results of the system of FIG. 7 when disc-drive pickup signals are not dynamically adjusted.
Figure 8B:
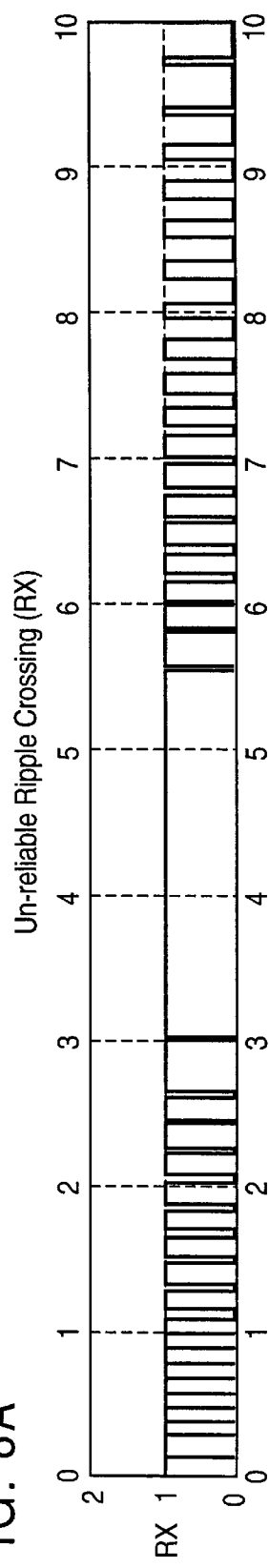
Figure 8C:
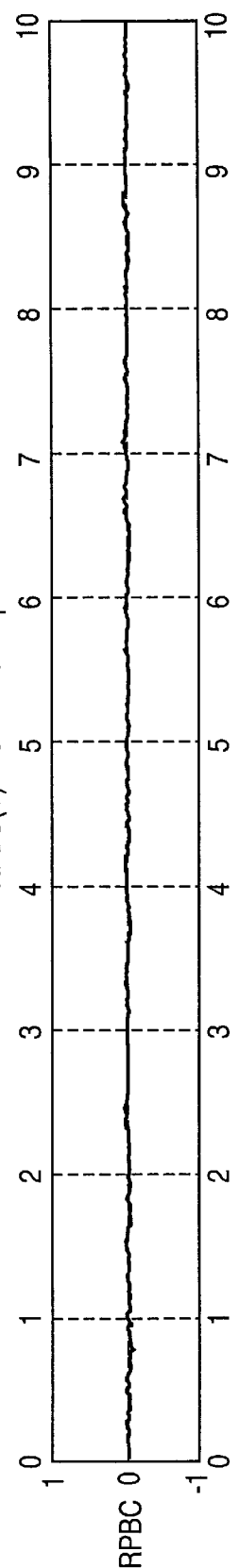

FIGS. 8A–8C illustrate a simulation (based on the model of FIG. 7) of a 32 track fine search without utilizing dynamic adjustment of disc-drive pickup signals as described above. As shown in FIG. 8A, RFRP falls below Vref (0 volts) from about 2.5 to about 5.5 milliseconds. As a result, RX (FIG. 8B) fails to oscillate over this same period, erroneously reporting no track crossings and theoretically losing its quadrature relationship with a corresponding TX signal (not shown).

Figure 9A:
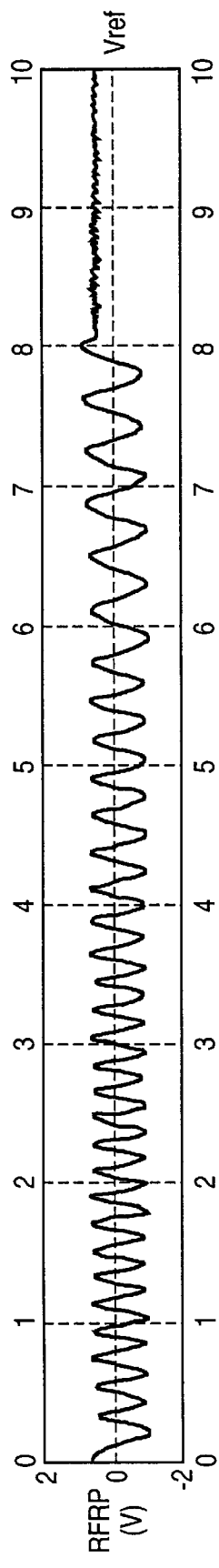
FIG. 9A–9C are simulation results of the system of FIG. 7 when disc-drive pickup signals are dynamically adjusted.
Figure 9B:
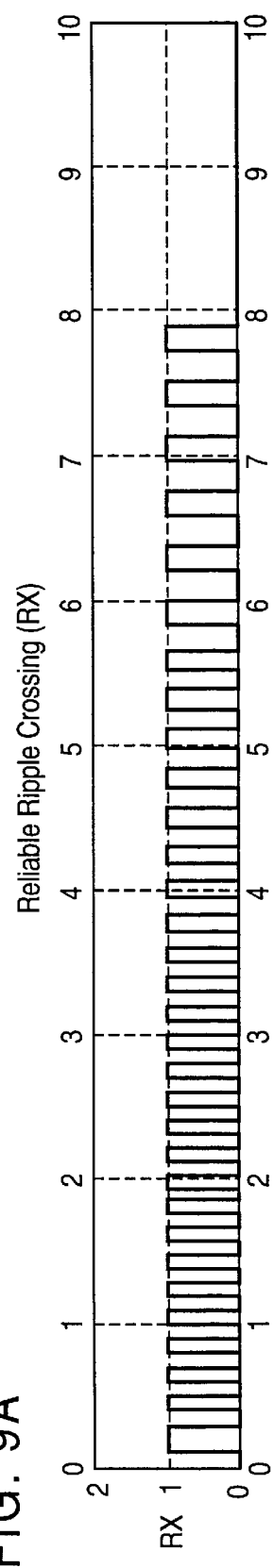
Figure 9C:
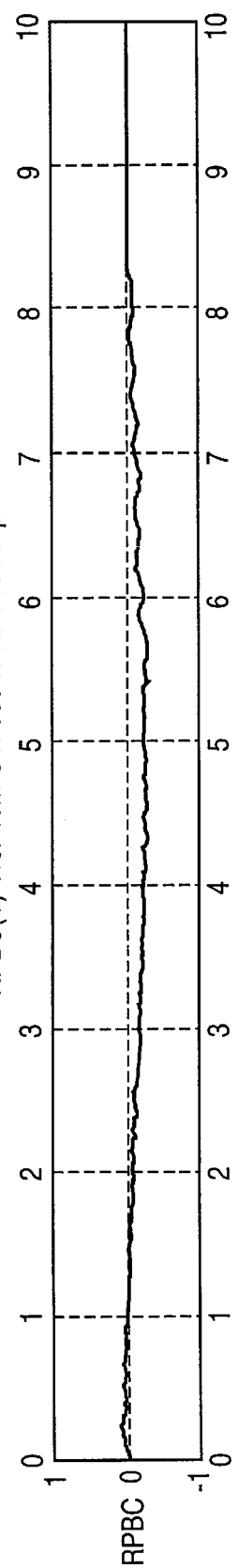

In contrast, FIGS. 9A–9C illustrate a simulation (based on the model of FIG. 7) of a 32 track fine search utilizing dynamic adjustment of disc-drive pickup signals as described above. As shown in FIG. 9A, RFRP now consistently maintains a relatively symmetric oscillation about Vref (0 volts) due to correction bias applied by RPBC (FIG. 9C). As a result, a relatively symmetric duty cycle is achieved and RX (FIG. 9B) accurately reports track crossings during the entire search.

Dynamic adjustment of disc-drive signals, as indicated above, may be performed in systems utilizing sample clocks operating at a single, fixed frequency (e.g., "Sample_clk" fed to integrators 502, 552 in FIG. 5 and the fast switch 706 of system 700 in FIG. 7, both operating at about 352.8 kHz). Such static state can result in inaccuracies since track crossing speeds will fluctuate widely during the course of a search. For example, a pickup typically accelerates to a relatively high track-crossing speed at the start of a search. Moreover, this pickup will subsequently decelerate to a slower speed as it approaches the target track.

Accordingly, a high, fixed sampling frequency applied to a slow track crossing (e.g., following pickup deceleration) when the duty cycle is nonsymmetric can produce an exaggerated value that overcompensates for the nonsymmetry. Similarly, a low, fixed sampling frequency applied to a fast track crossing (e.g., following pickup acceleration) regardless of the duty cycle may fail to sample a significant portion of the duty cycle and thereby produce inaccurate values. In short, using a fixed sampling frequency in accordance with at least one embodiment of FIGS. 5 and 7 can produce a non-constant gain of the feedback loops during a search, resulting in overcorrecting or undercorrecting and ultimately leading to an unsuccessful search when the quadrature phase relationship (i.e., overlap of ideally 90°) between TX and RX is lost. This relationship (which may be less than 90°), is used to determine search direction.

More specifically, track crossing speeds (which control the frequency of pickup signals RFRP and TE) can vary from about zero (0) Hz to about 1000 Hz during "static calibration" (measuring and calibrating for disc runout at 1× CD-ROM rates, as is well known in the art) to over 120 kHz during a 12× search. Since the gain of the feedback loops in FIG. 5 depend on the integration rate (i.e., number of samples or counts made by integrators 502, 552), the sampling clock should also be made variable. Preferably, such sampling should be proportional to the track crossing speeds.

Figure 10:
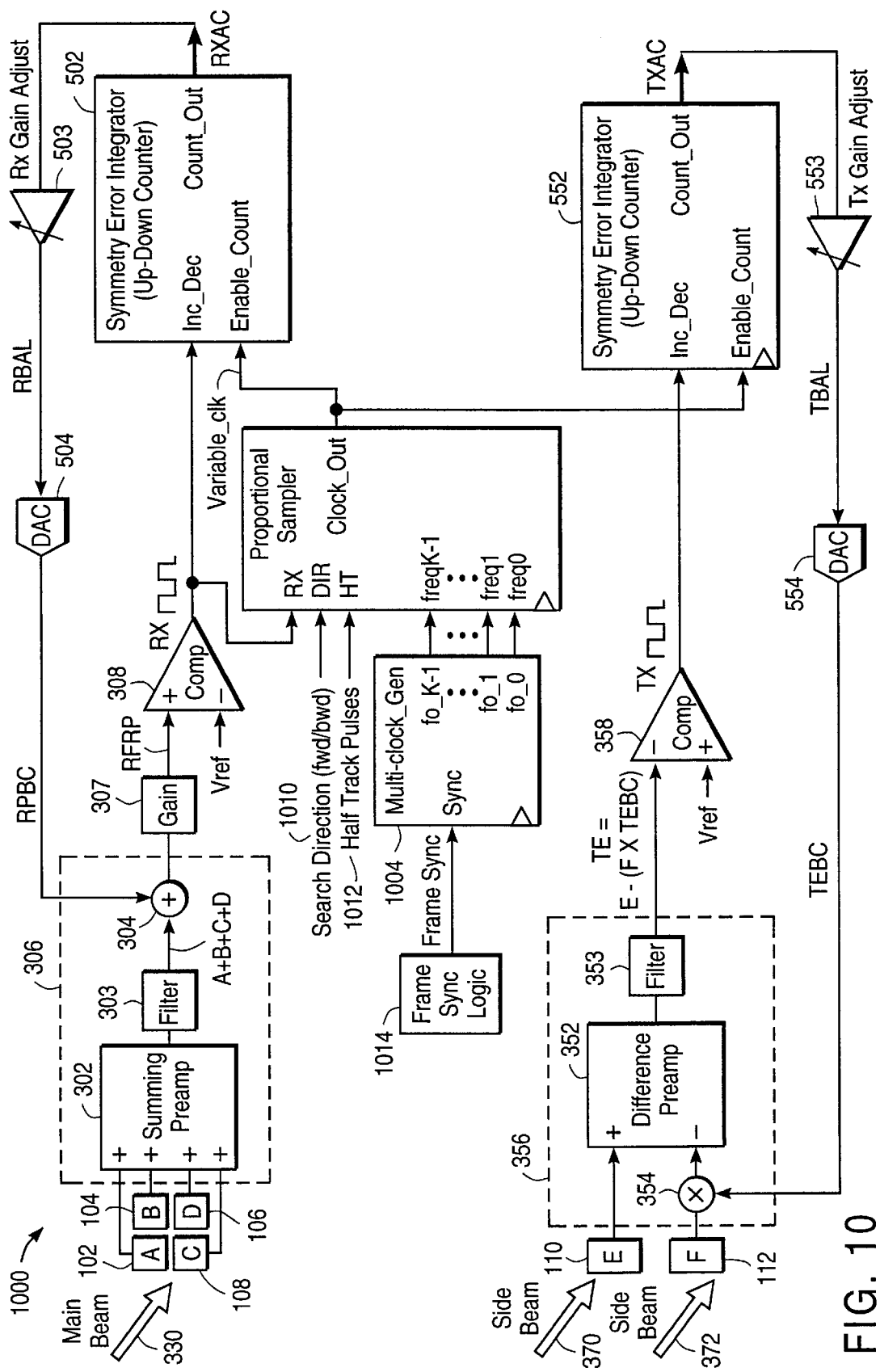
FIG. 10 is a block diagram of a system providing proportional sampling for dynamic adjustment of disc-drive pickup signals in accordance with the invention.

FIG. 10 illustrates a block diagram of a system 1000 providing proportional sampling for dynamic adjustment of disc-drive pickup signals in accordance with a preferred embodiment of the invention. Such proportional sampling helps to achieve a more consistent gain and therefore provides a more accurate correction to pickup signals.

Referring to FIG. 10, system 1000 includes symmetry error integrator 502 coupled to RX Gain Adjust 503 which is, in turn, coupled to DAC 504. The output of DAC 504 is fed into summing junction 304. Moreover, junction 304 is part of circuit 306 which, as described above in connection with FIG. 5, receives input from photodiodes 102–108 and outputs an oscillating signal to comparator 308 through gain circuitry 307. These elements of system 1000 facilitate processing of signal RFRP to produce a signal RX having an approximately symmetric (i.e., 50-50) duty cycle.

System 1000 also includes a symmetry error integrator 552 coupled to TX Gain Adjust 553 which is, in turn, coupled to DAC 554. The output of DAC 554 is fed into multiplying junction 354. Junction 354 is part of circuit 356 which, as described above in connection with FIG. 5, receives input from photodiodes 110, 112 and outputs an oscillating signal to comparator 358. These elements of system 1000 facilitate the processing of signal TE to produce a signal TX having an approximately symmetric (i.e., 50-50) duty cycle.

System 1000 further includes proportional sampler 1002 which provides a variable sampling clock (also referred to as a "sampling strobe") to the "Enable_Count" inputs of integrators 502 and 552. Proportional sampler 1002 inputs signal RX from comparator 308, a search-direction signal "DIR" 1010 (described below), half-track pulses 1012 (described below) and a number of clock signals (i.e., "K") at varying frequencies. These clock signals are generated by a multi-clock generator 1004 which is synchronized with a disc drive system clock through the use of a conventional frame sync signal generated by "frame sync" logic 1014.

Frame sync logic 1014 is a conventional circuit that periodically generates a pulse to synchronize multi-clock generator 1004 with a disc-drive system clock. In a preferred embodiment, this synchronization pulse operates at a frequency of about 352 kHz and the system clock at about 33 MHZ.

In a preferred embodiment, integrators 502 and 552 are simply up-down counters with no underflow and no overflow. If counting up, these integrators are not allowed to count beyond their highest positive number and if counting down, beyond their lowest negative number. As described in FIG. 5 above, the direction of count for integrators 502 and 552 are controlled by the value of the RX and TX quadrature signals, respectively. A variable frequency clock generated by sampler 1002 and adjusted to be much higher than the frequency of track-crossing provides the sampling strobe (which enables counting operations) for each integrator 502, 552.

Multi-clock generator 1004 is a conventional clock divider module generating a discrete number of different frequency strobes. In a prototype of system 1000, strobes operating at eight frequencies from about 22 kHz to about 2.8 MHZ in multiples of two were used (i.e., 22 kHz, 44 kHz, 88 kHz, etc., up to 2.8 MHZ). However, as would be understood by one having ordinary skill in the art, any number of frequencies and any ratio between adjacent frequencies can be used.

Proportional sampler 1002 provides a sampling strobe to integrators 502, 552 at a frequency proportional to track-crossing speed. Such variable frequency stabilizes the integration rate of integrators 502, 552 by keeping the number of sample pulses per track crossing (and therefore the number of counts performed by integrators 502, 552) within a window defined by ratios of frequencies between adjacent strobe inputs of multi-clock generator 1004. As described below, proportional sampler 1002 uses half-track pulses and a search-direction signal to determine the boundary for one full-track crossing. For any particular track-crossing speed, sampler 1002 will generate a strobe that toggles between a higher frequency that takes more than "M" samples during a full-track crossing and the next lower (i.e., adjacent) frequency that takes less than "M" samples during such full-track crossing. The value "M" represents the desired number of samples (or counts) per track crossing. Each "sample" results in a count generated by integrators 502, 552 in the form of an increment or decrement as directed by the values of signals RX and TX, respectively.

Multi-clock generator 1004 automatically provides for two new "adjacent" frequencies when a new clock frequency is selected except for the first frequency (i.e., freq0) which has no adjacent lower frequency and the Kth frequency (i.e., freqK−1) which has no adjacent higher frequency. Should these extreme frequencies be selected, generator 1004 will simply re-assert the currently-selected frequency as a lower or higher "adjacent" frequency for the first and Kth frequencies, respectively.

Changes in sampling strobe frequency occur on a full-track boundary. A preferred method for changing frequencies is shown in a flow chart 1100 in FIG. 11. The variables used in this flow chart are defined in Table 3 below.

TABLE 3

| Variable | Definition |
| --- | --- |
| K | Number of monotonically increasing frequencies from $F_0$ to $F_{K-1}$ |
| FN | Present integrator sampling frequency |
| $F_{TX}$ | Track crossing frequency |
| M | Desired number of samples per track crossing |
| $R_{AF}$ | $F_{N+1}/F_N$, the adjacent frequency ratio |

Figure 11:
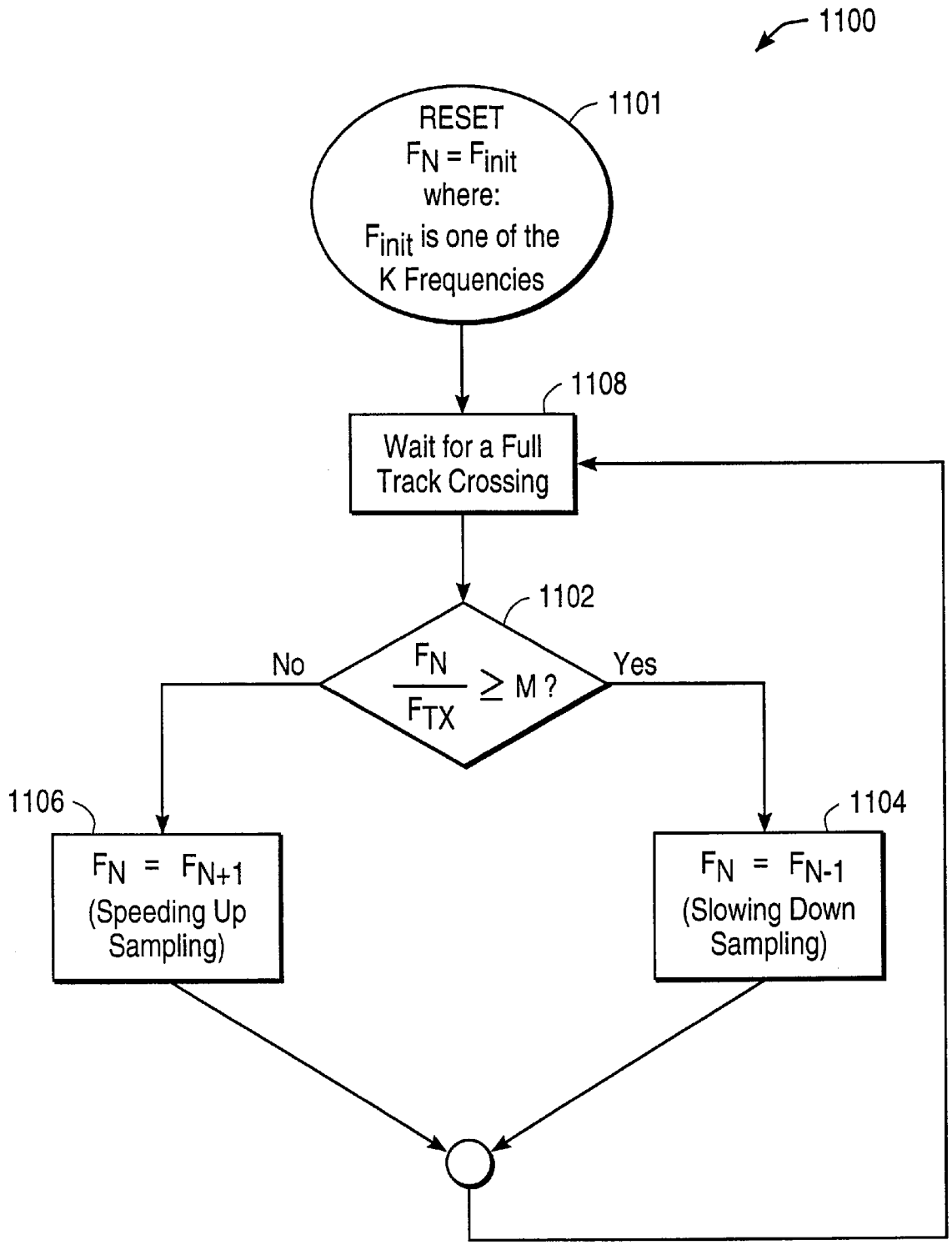
FIG. 11 is a flow chart illustrating operation of a proportional sampler disposed within the system of FIG. 10.

Referring to FIG. 11, proportional sampler 1002 provides a sampling strobe to integrators 502, 552 during a track search operation (as well as other operations including static calibration). The frequency of this strobe is represented by variable $F_N$ in flow chart 1100.

Pursuant to block 1101, a sampling frequency is selected from one of the "K" frequencies available from multi-clock generator 1004 to serve as the initial value for $F_N$ in the present search. This selection is preferably carried out by simple reliance on a pre-set default value hard wired into the circuit. Alternatively, the initial value may be specifically chosen based upon some predictive criteria, such as the last value used in the immediately prior search.

After a first full track is crossed pursuant to block 1108, a track crossing frequency represented by variable $F_{TX}$ is determined (based upon the time required to complete the crossing) and the threshold condition of "$F_N/F_{TX} \geq M$" is tested pursuant to block 1102. Significantly, the ratio $F_N/F_{TX}$ need not be computed to perform this threshold test. Rather, the generation or non-generation of a terminal count signal (TC) by a counter 1204 (FIG. 12) within a specified period based upon real-time signals, as described below, resolves the threshold test of block 1102.

If the sampling strobe is operating at too high a frequency (this upper limit being conceptually defined by the ratio of block 1102 being greater than or equal to M), a next lower frequency ($F_{N-1}$) is selected by sampler 1002 in accordance with block 1104. Conversely if the sampling strobe is operating at too low a frequency (this lower limit being conceptually defined by the ratio of block 1102 being less than M), a next higher frequency ($F_{N+1}$) is selected from generator 1004 to speed up the sampling in accordance with block 1106. This new sampling frequency is utilized by sampler 1002 until the next full track crossing is complete pursuant to block 1108. At such time, control returns to block 1102 to repeat the foregoing operation.

As an alternative embodiment, sampler 1002 may increment or decrement the sampling frequency a greater amount than simply the next highest or next lowest frequency provided by multi-clock generator 1004. In such an embodiment, the change in frequency would be dependent upon the size of the difference between M and the ratio $F_N/F_{TX}$.

As described above, sampler 1002 either increments or decrements the sampling frequency at the end of each track crossing cycle (i.e., a full-track crossing). In yet another embodiment, 1002 may simply retain the current sampling frequency when $F_N/F_{TX}$ equals M. But, like the method described in flow chart 1100, this alternative would also increment the sampling frequency if $F_N/F_{TX}$ is less than M and decrement this frequency if $F_N/F_{TX}$ is greater than M. As described above, the ratio $F_N/F_{TX}$ need not be computed; rather, relative sampling rate is determined by monitoring real-time signals as described below.

Upon reaching a destination track in a track search, integrators 502, 552 are disabled by a control signal from a microprocessor or some other control circuitry (not shown). Accordingly, the value $F_N$ remains unchanged until the start of the next search, when the sequence of FIG. 11 begins again starting at block 1101. Similarly, when performing static calibration, integrators 502, 552 are disabled when an approximate 50-50 duty cycle is reached for signals RFRP and TE. At the start of a subsequent search, the sequence of FIG. 11 begins again starting at block 1101.

Figure 12:
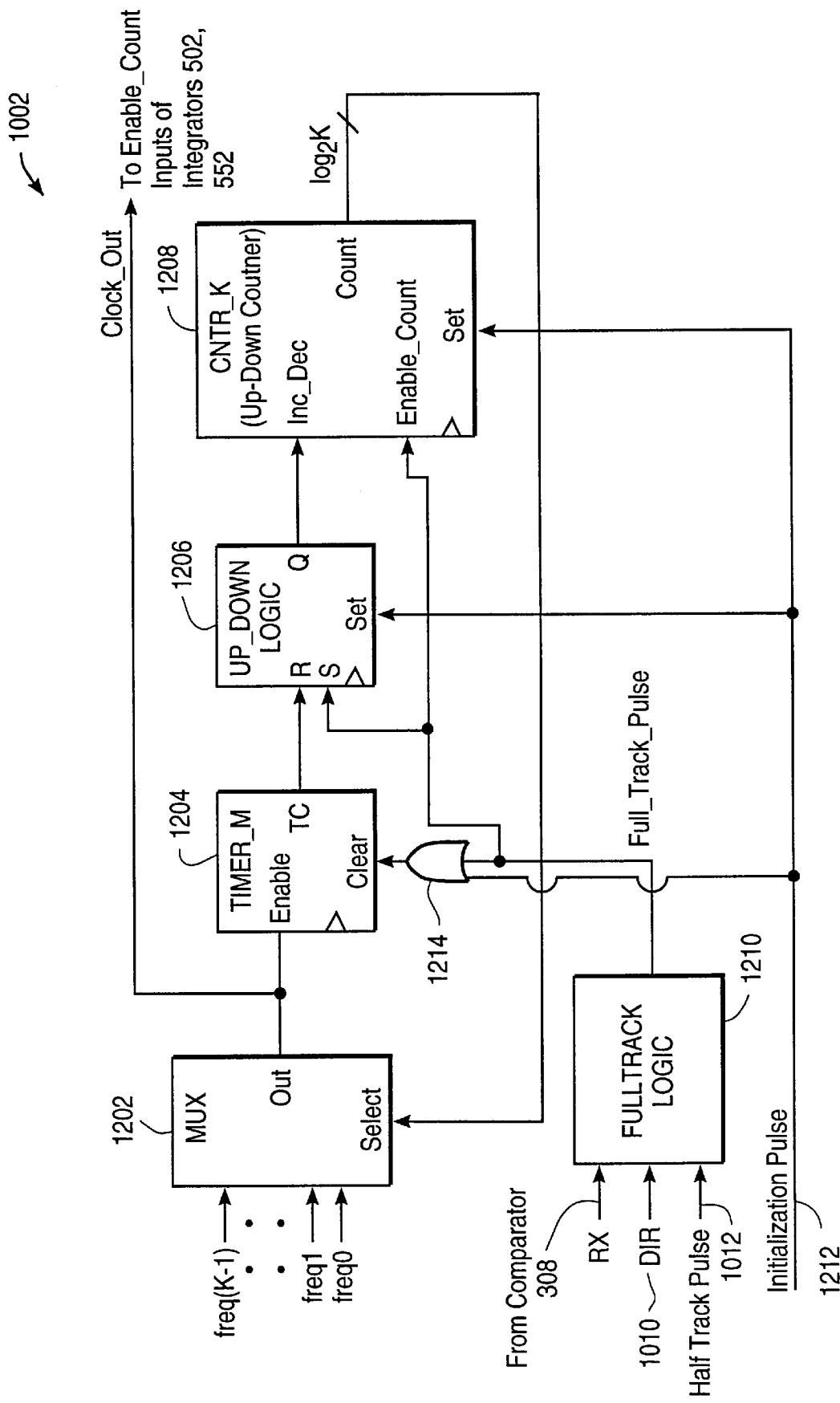
FIG. 12 is a block diagram of the proportional sampler disposed within the system of FIG. 10.

FIG. 12 illustrates a block diagram of proportional sampler 1002. Referring to FIG. 12, sampler 1002 includes a multiplexer 1202 which receives the various clock signals from multi-clock generator 1004 and selects one of these as an output to integrators 502 and 552 (FIG. 10). Multiplexer 1202 is coupled to timer 1204 which is, in turn, coupled to up-down logic 1206 whose output is coupled to up-down counter 1208. The output of counter 1208 (a selection signal used to control multiplexer 1202) is returned to the select input of multiplexer 1202. Sampler 1002 also includes full-track logic 1210 which receives the RX signal and search-direction signal ("DIR") 1010 as well as half-track pulses 1212. The output of logic 1210 is coupled to timer 1204 (clear input) through OR gate 1214, logic 1206 (S input) and counter 1208 (Enable_Count input). Finally an initialization pulse 1212 controlled by a microprocessor (not shown) is coupled to timer 1204 (clear input) through OR gate 1214, logic 1206 (set input) and counter 1208 (set input).

In the embodiment of FIG. 12, multiplexer 1202 selects one of K clock signals wherein each signal is operating at a different frequency. Selection is carried out by counter 1208 having K counts. This counter is designed to clip when there is an overflow or an underflow. In a prototype of this embodiment, the target number of samples per track crossing was 32 (i.e., M=32) and the number of strobe frequencies was 8 (i.e., K=8).

Timer 1204 is a conventional modulo M binary counter that generates a terminal count ("TC") when the count value reaches all ones (i.e., a full count or "M"). Each count is enabled by the sampling strobe output by multiplexer 1202 (i.e., Timer 1204 increments by 1 at each strobe pulse).

Figure 13A:
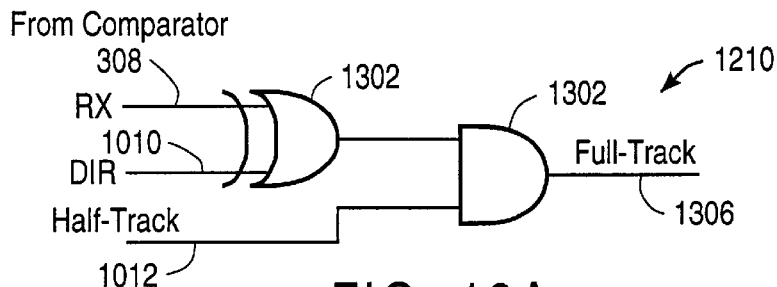

Full-track logic 1210 generates a full-track pulse (representing a full-track crossing) from half-track pulses 1012, RX signal from comparator 308 and DIR signal 1010 as shown in FIGS. 13A and 13B. Referring to FIG. 13B, half-track pulses 1012 are generated at each transition of the TX signal. Conventional logic may be used to generate these pulses such as edge-triggered circuits functioning like one-shots (e.g., one circuit triggered in a low-to-high TX transition and another triggered in a high-to-low TX transition) ORed together so that pulses are generated at each TX transition. Variations to this circuit and construction of other appropriate circuits would be apparent to those having ordinary skill in the art.

Referring again to FIG. 13B, DIR signal 1010 is determined by the relative order of RX and TX signals. As shown in this figure, DIR is a logic 0 representing a forward search (illustrated by forward-search arrow 1320) when signal RX leads signal TX (ideally by 90°). Conversely signal DIR is a logic 1 representing a backward search (illustrated by backward-search arrow 1322) when RX lags signal TX (again, ideally by 90°). The logic necessary to create signal DIR based upon signals RX and TX is conventional and well known to those having ordinary skill in the art. For example, a conventional state machine may be constructed that generates a logic 0 for DIR (representing a forward search) if RX is a logic 1 when TX transitions from logic 0 to 1. Alternatively, this state machine would generate a logic 1 for DIR (representing a backward search) if RX is a logic 0 when TX transitions from logic 0 to 1.

Referring again to FIGS. 13A and 13B, a full-track pulse 1306 is generated at the positive edge of signal TX. As is well known in the art, there are numerous ways of constructing an edge detector. This particular way was chosen because the half-track pulses are glitch free and already generated for other purposes. Referring again to FIG. 13A, full-track logic 1210 includes exclusive OR gate 1302 (which inputs signals RX and DIR 1010) coupled to AND gate 1304 (which inputs half-track pulses 1012 and the output of gate 1302). Full-track pulses 1306 are output from AND gate 1304.

As the foregoing illustrates, the purpose of signal DIR is for marking the full-track boundaries so that sampling speeds may change on a fresh cycle (e.g., upon completing each traversal of a track). The inclusion of signal DIR, however, is not critical. As would be apparent to one having ordinary skill in the art, other signals and methods could be used to identify full-track boundaries. If signal DIR is not used, it is possible that one cycle of TX or RX, during runout (i.e., off-centered disc rotation), in the transition from moving forwards to moving backwards will be sampled by two frequencies creating a perturbation. But subsequent cycles will correct that perturbation. Since the number of track crossings occurring during a direction change is typically very small, the net result is a possible delay (or possible acceleration) in the final settling of a correction bias loop (e.g., system 501 or 550).

However, it is preferred to use signal DIR since it provides a clean switchover in sampling speeds per track crossing. In summary, although signal DIR is not necessary to carrying out dynamic adjustment of pickup signals and proportional sampling in accordance with the present invention, it is desirable. (conversely, DIR is of considerable importance in determining the number of tracks to move across during a search with a disc that experiences runout.)

Figure 14A:
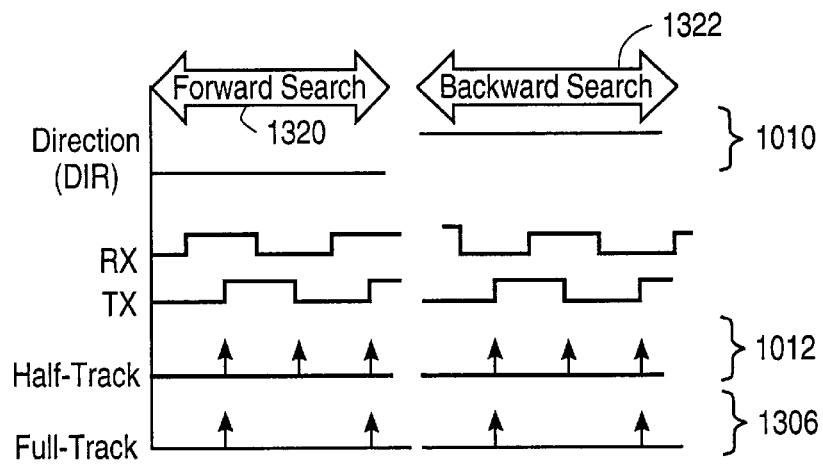
FIGS. 14A and 14B are diagrams illustrating composition and operation of up-down logic disposed within the proportional sampler of FIG. 12.
Figure 14A:
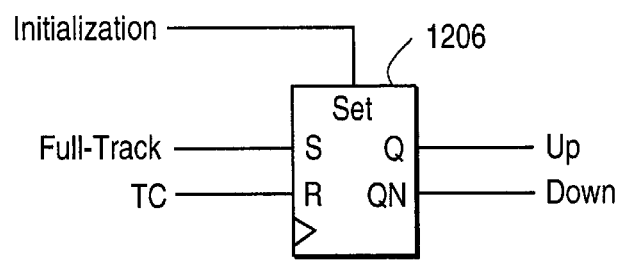
Figure 14B:
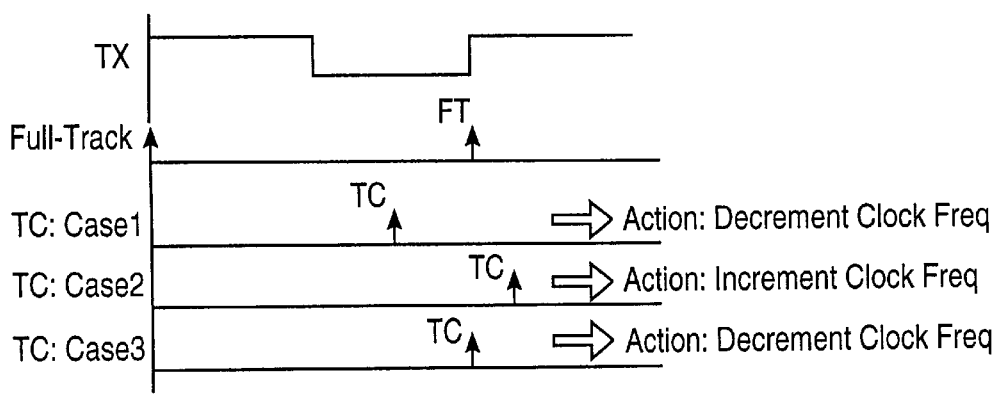

Referring again to FIG. 12, logic 1206 may be constructed from an RS flip-flop or similar structure. Logic 1206 is used to increment or decrement counter 1208. The operational timing of logic 1206, as described below, is illustrated graphically in FIG. 14B. Referring to FIGS. 12, 14A and 14B, a full-track pulse issued from logic 1210 resets the timer 1204. If the next full-track pulse is generated before timer 1204 issues a TC, this implies the sampling clock is slow and therefore logic 1206 outputs a logic 1 directing counter 1208 to increment its count. As a result, the output of counter 1208 selects the next higher frequency available at multiplexer 1202. However, if TC is generated before or at the same time as a new full-track pulse (i.e., M or more samples were taken during the period), logic 1206 is reset and outputs a logic "0" which directs counter 1208 to decrement at the next full-track boundary thereby selecting the next lower frequency available at multiplexer 1202.

The foregoing timing is illustrated in FIG. 14B. In a preferred embodiment, logic 1206 is an RS flip-flop defined to reset when R and S arrive at the same time. In the embodiment of FIG. 12, the single Q output of logic 1206 is utilized to direct counter 1208. Alternatively, as shown in FIG. 14A, both Q and Q complement ("QN") outputs may be utilized to indicate an increment or decrement, respectively, in clock frequency.

Referring again to FIG. 12, up-down counter 1208 operates (i.e., counts) at full-track boundaries. Upon receipt of a full-track pulse from logic 1210, counter 1208 will increment or decrement by 1 based upon the value placed at its "Inc_Dec" input by logic 1206. A logic 0 at this input will cause counter 1208 to decrement and a logic 1 will cause this counter to increment.

Accordingly, determination of the next sampling frequency ($F_N$) is based upon the processing of real-time signals including a full-track pulse (FT) and terminal count (TC). No computation of the ratio $F_N/F_{TX}$ (described above in connection with FIG. 11) is necessary. As such, the system of FIG. 10 may be constructed from relatively simple hardware including counters without the need for microprocessor-type capability to perform resource-demanding arithmetic calculations (e.g., the calculation of $F_N/F_{TX}$). Such embodiment avoids the cost and complexity of microprocessor-based designs as well as potential limitations in processing bandwidth (compared with simple counters).

Referring again to FIG. 12, an initialization pulse 1212 is conveyed to the set inputs of both logic 1206 and counter 1208, and the clear input of timer 1204 through OR gate 1214. The initialization pulse resets timer 1204, sets up-down logic 1206 and sets counter 1208 thereby initializing the beginning frequency at the start of a search or static calibration operation. Initialization pulse 1212 is triggered by the start of such operations through a conventional microprocessor or standard hardware power-on reset circuitry.

In general, the systems of FIGS. 5 and 10 utilize relatively simple components and therefore demand less silicon when fabricated than computation-intensive components, such as microprocessors. Moreover, in accordance with the present invention, sampling frequency ($F_N$) slows down as needed to keep samples relatively constant for each track crossing. Accordingly, enabling hardware such as timer 1204 may be kept relatively small in accordance with the relatively constant sample rate to minimize even further the amount of silicon required to fabricate the system of FIG. 10 on a semiconductor chip.

Figures 15A, 15B:
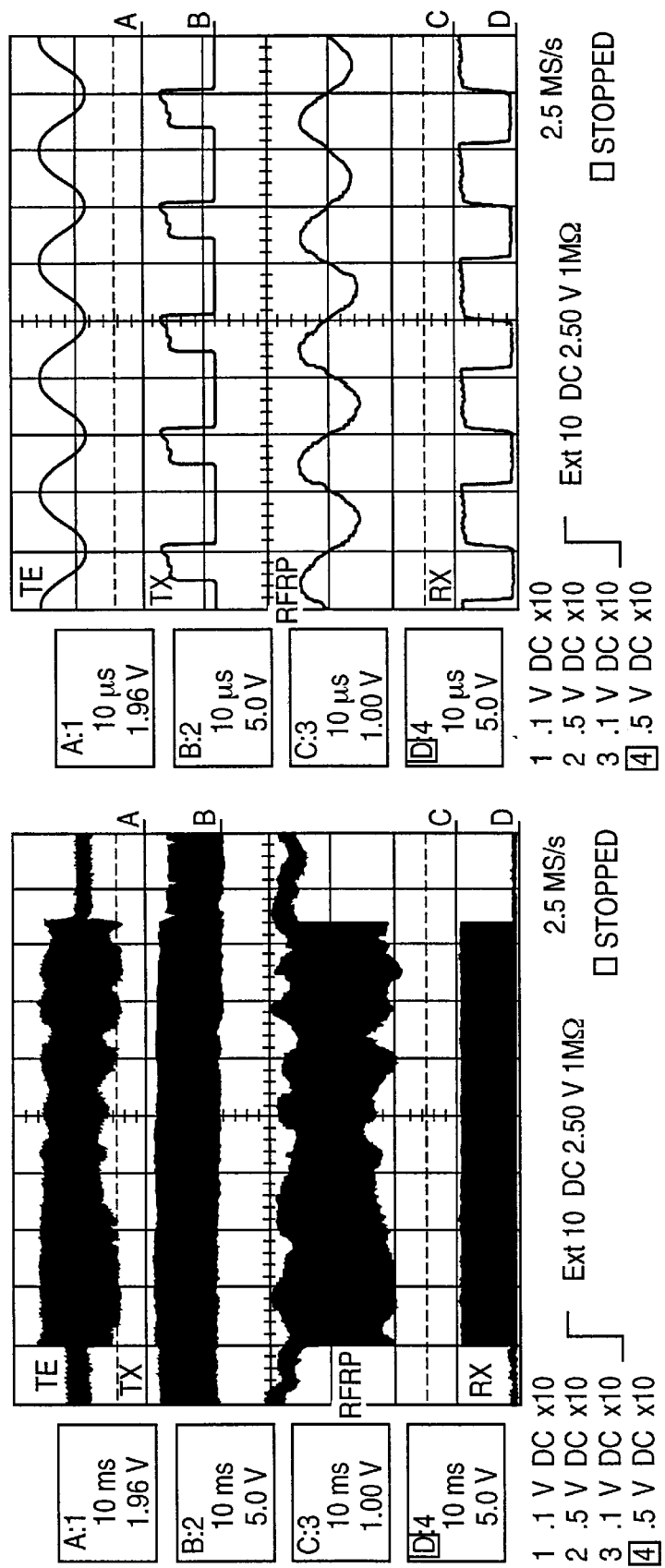
FIGS. 15A and 15B illustrate performance results of the system of FIG. 10 in a 2047 Track Fine Search with Wobble Disc without proportional sampling and dynamic adjustment of disc-drive pickup signals.

FIGS. 15A and 15B illustrate performance results of System 1000 in a 2047-track fine search using a "Wobble Disk" (i.e., an optical disc having an intentional, vertical deformation used for testing purposes) without proportional sampling and dynamic adjustment of disc-drive pickup signals. On this occasion, this particular drive successfully completed its search, although signals TX and RX were very close to losing their quadrature overlap (FIG. 15B). Should this overlap be lost, it would not be possible to determine direction of some portions of the subject search, resulting in a track miscount.

Figures 16A, 16B:
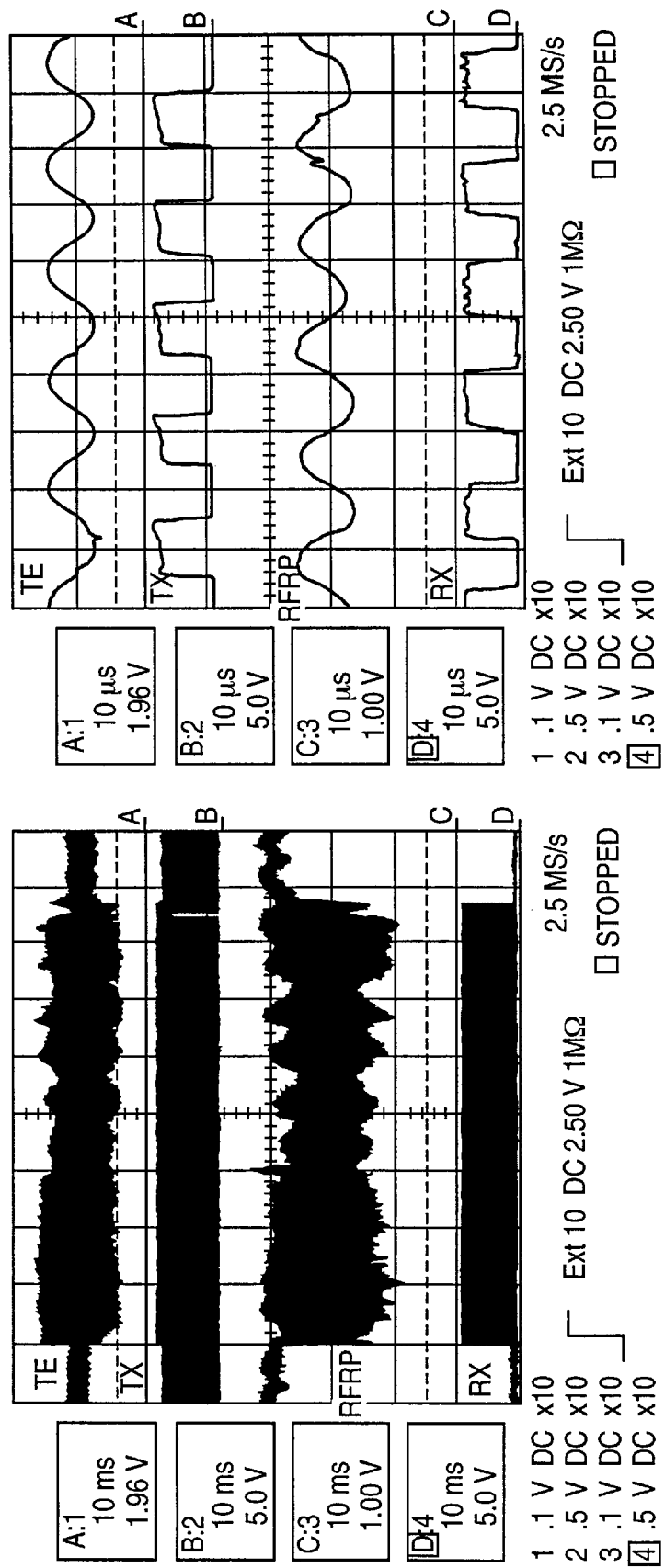
FIGS. 16A and 16B illustrate performance results of the system of FIG. 10 in a 2047 Track Fine Search with Wobble Disc with proportional sampling and dynamic adjustment of disc-drive pickup signals.

FIGS. 16A and 16B illustrate performance results of system 1000 in a 2047-track fine search using the Wobble Disk with proportional sampling and dynamic adjustment of disc-drive pickup signals in accordance with the present invention. With dynamic adjustment being applied, signals TX and RX moved closer to the ideal 50-50 duty cycle and the quadrature overlap was increased. In the prototype drive which generated these signals, TE and RFRP were not exactly 90° out of phase which explains why signals TX and RX did not have a 90° overlap even though they were near perfect square waves.

Figure 17:
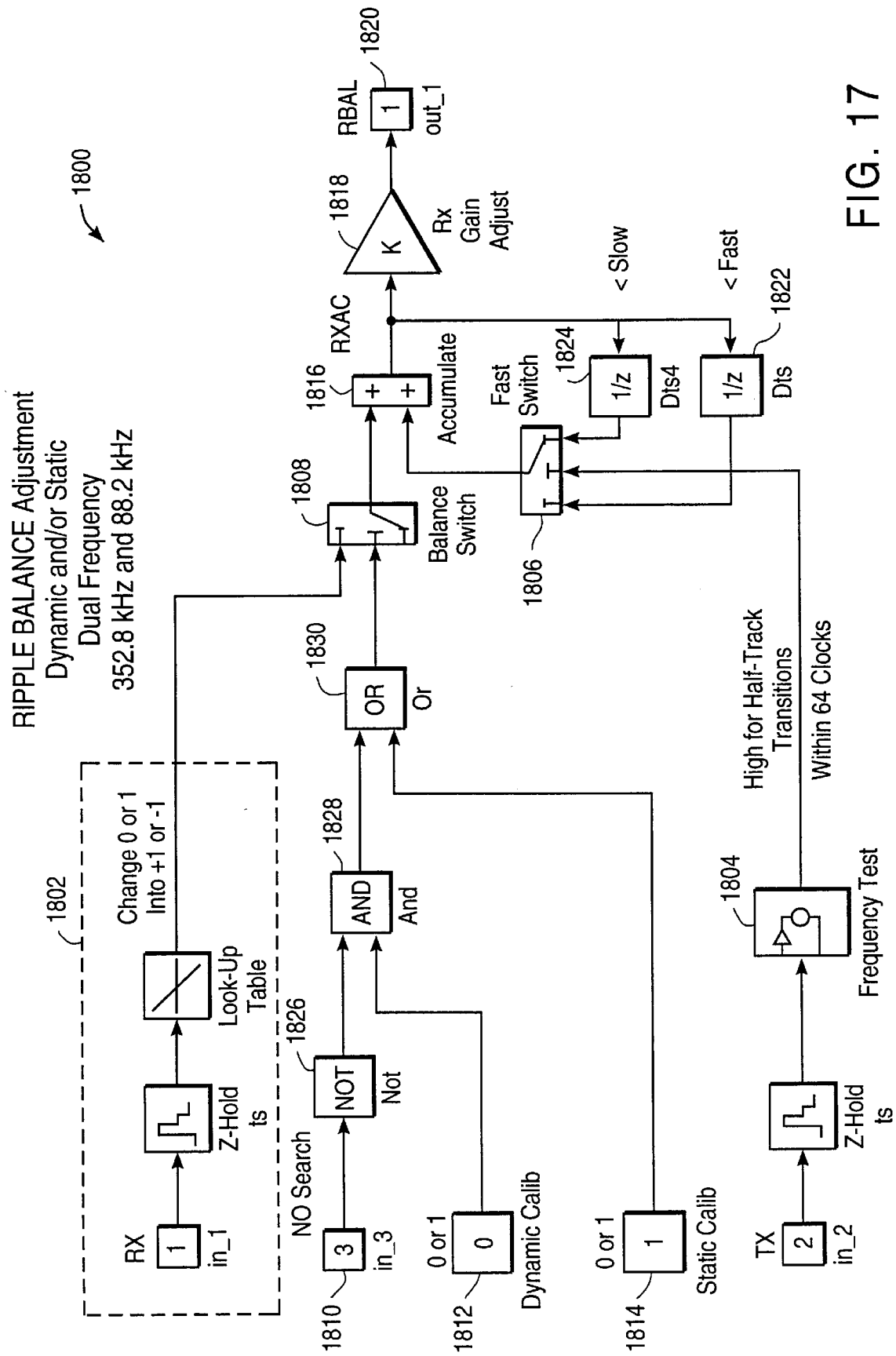
FIG. 17 is a diagram of a simulation of a system with two-speed sampling for dynamic adjustment of disc-drive pickup signals in accordance with an alternative embodiment of the invention.

FIG. 17 illustrates a simulation model of an alternative embodiment of the present invention. In this model, two-speed sampling is provided for dynamic adjustment of disc-drive pickup signals. In this case, variable sampling is controlled exclusively by the frequency of signal TX. Select elements and operations of FIG. 17 are described in Table 4 below.

TABLE 4

| Element | Operation |
| --- | --- |
| Block 1802 | Converts an RX wave oscillating between 0 and 5 volts to a simulation signal oscillating between +1 and −1, respectively. |
| Balance switch 1808 No Search 1810 Dynamic Calib 1812 Static Calib 1814 | A switch controlled by "No Search"1810 (active low signal; search enabled when 0), "Dynamic Calib" 1812 (signal controlled by a microprocessor (not shown) to enable dynamic adjustment) and "Static Calib" 1814 (signal controlled by the microprocessor to enable static calibration). If the logical combination of these signals (as illustrated in FIG. 17) produces a logic 1, balance switch 1808 will allow output of block 1802 to pass to RXAC 1816 (RX accumulator). Alternatively, if such combination produces a logic 0, balance switch 1808 is tied low preventing such output. |
| Accumulation Blocks 1822, 1824 | Block 1822 allows accumulation of a ±1 value generated by block 1802 to occur every clock cycle. Block 1824 allows accumulation of such ±1 value to occur only once every four clock cycles. |
| Frequency test 1804 Fast switch 1806 | Frequency Test 1804 identifies low-speed track crossing based on signal TX. If no TX transition is detected over 64 clock cycles, a fast switch 1806 is tied to a slow accumulation block 1824 which slows RXAC 1816 operation to one quarter its normal rate (i.e., an accumulation occurs once every four clock cycles). This enables a gradual modification to the RPBC signal during slow speed and/or stalls. Alternatively, if TX transitions are occurring within the 64 cycle interval, fast switch 1806 selects accumulation block 1822 which allows accumulations to occur at every clock cycle. Fast Switch 1806 outputs accumulated values at a maximum system frequency if accumulation block 1822 is selected and at one-quarter this rate if accumulation block 1824 is selected. |
| RXAC 1816 | (RX accumulator) When active, this block continues to sum positive or negative ones (as output by block 1802) at frequencies defined by accumulation blocks 1824 and 1822 to produce a correction bias. |
| RX Gain Adjust 1818 | Multiplier scaling function that converts the output of RXAC 1816 to a value capable of being converted by a particular DAC to an appropriately proportional signal. |
| RBAL 1820 | Digital representation (signed integer number) of RPBC. Requires conversion by DAC to become RPBC (analog voltage). |
| Static calib 1814 | Same definition as in Table 2. |
| Logic Blocks 1826–1830 | Logic block 1826 is a logic NOT (inverter), block 1828 is a logic AND and block 1830 is a logic OR. |

Figure 18A:
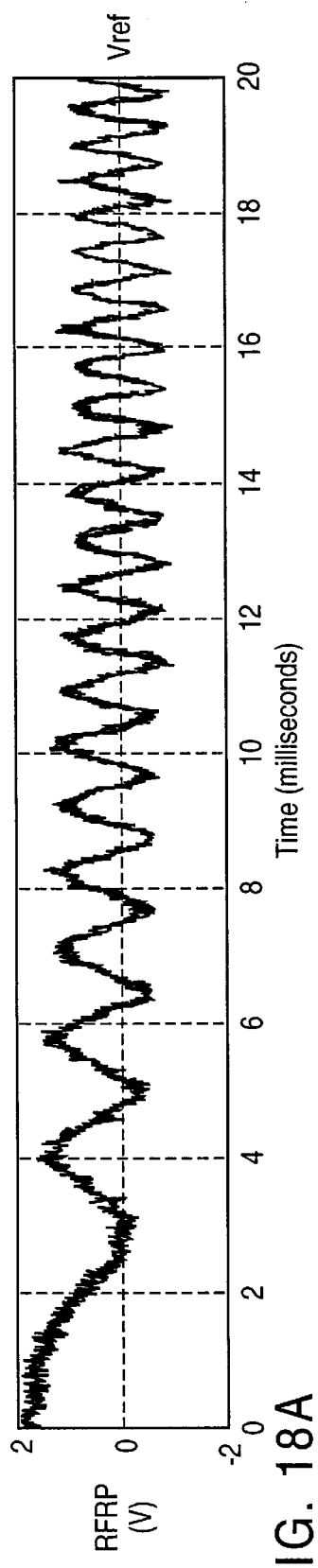
FIGS. 18A–18C are simulation results of the system of FIG. 17 illustrating dynamic adjustment of disc-drive pickup signals.
Figure 18B:
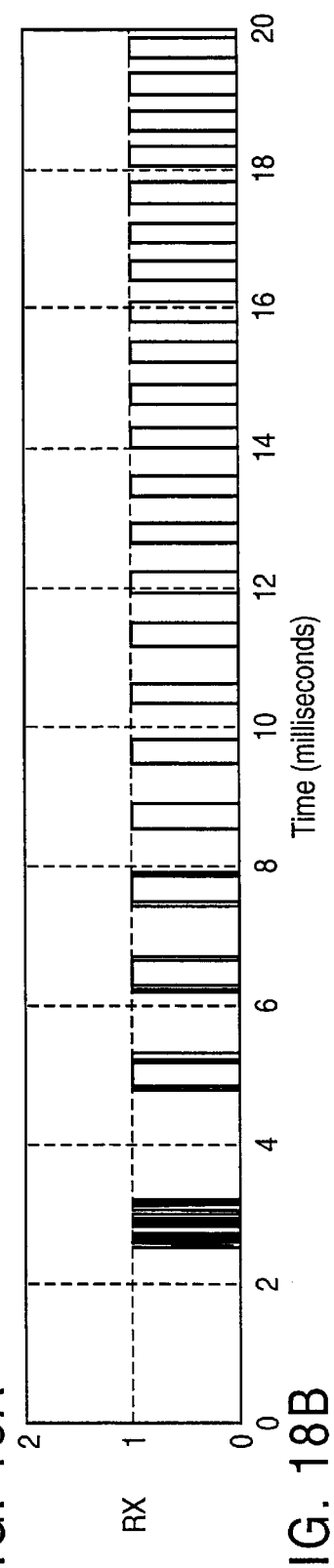
Figure 18C:
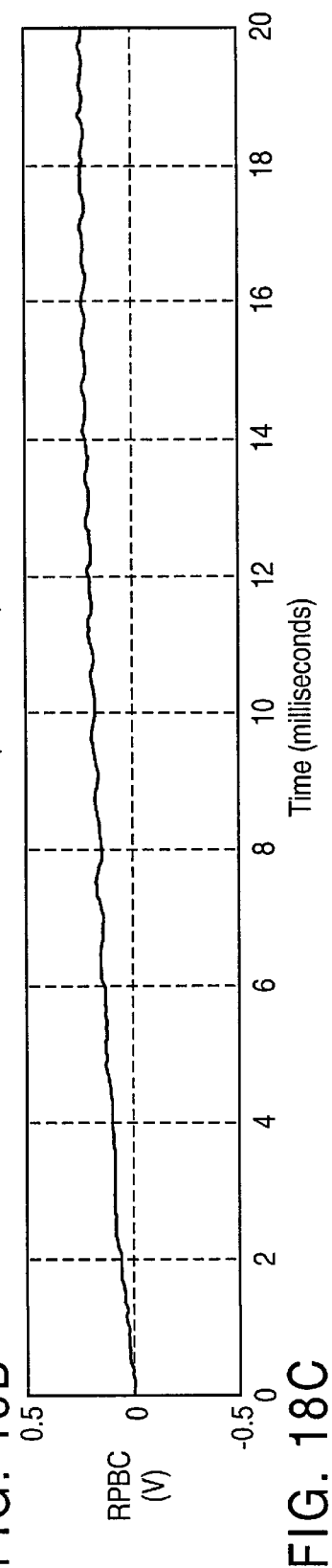

FIGS. 18A through 18C illustrate a simulation (based on the model of FIG. 17) of a disc-drive static calibration (i.e., 1× rotation with stationary pickup) utilizing two-speed sampling for dynamic adjustment of disc-drive pickup signals. As shown in FIG. 18A, region 1902 is just barely in range (i.e., oscillating slightly under $V_{ref}$, set at 0 volts). Accordingly, pursuant to the simulation of FIG. 17, signal RPBC (FIG. 18C) is gradually increased under the control of RX (FIG. 18B) to compensate for the RFRP signal which is initially just barely in range.

This gradual modification occurs at a rate defined by TX, which may be one-quarter of the standard rate or the full rate depending upon the frequency of TX transitions, as described in Table 4. Once RFRP is sufficiently biased to achieve a relatively symmetric duty cycle, signal RPBC will continue to be adjusted dynamically, as described above, to maintain this relationship. The sampling (or accumulation) frequency of RXAC 1816 will be determined by TX.

While the foregoing is a complete description of the embodiments of the invention, various modifications, alternatives and equivalents may be used. Accordingly, the above description should not be taken as limiting the scope of the invention which is defined by the appended claims.

We claim:

1. A circuit comprising:
   a summing junction that receives a first signal;
   a comparator for generating a second signal having a variable period based upon said first signal;
   a first up-down counter whose count direction is controlled by said second signal, said first up-down counter generating a correction bias signal;
   a proportional sampler providing a variable sampling strobe to said first up-down counter, said sampling strobe operable to adjust frequency of count operation in said first up-down counter based upon achieving a desired number of counts within approximately said variable period; and
   a feedback loop for returning said correction bias signal to said summing junction.

2. The circuit of claim 1 wherein said feedback loop includes a digital-to-analog converter that converts said correction bias signal into an analog correction bias signal.

3. The circuit of claim 1 wherein said second signal has a variable duty cycle and said correction bias signal is dependent upon said variable duty cycle.

4. The circuit of claim 1 further comprising a multi-clock generator coupled to said proportional sampler.

5. The circuit of claim 4 wherein said proportional sampler includes a multiplexer coupled to said multi-clock generator for selecting and outputting said sampling strobe.

6. The circuit of claim 5 wherein said proportional sampler further includes:
   a counter coupled to said multiplexer and receiving said sampling strobe, said counter generating a terminal count signal upon reaching said desired number of counts;
   a flip-flop coupled to said counter which records said terminal count when received at or before completion of approximately said variable period; and
   a second up-down counter, coupled to said flip-flop, for generating a selection signal based upon flip-flop contents, said selection signal used to control said multiplexer.

7. The circuit of claim 6 wherein said proportional sampler further includes logic for detecting completion of said variable period based upon said second signal.

8. A disc drive system including a disc containing a plurality of tracks, the disc drive system comprising:
   a first plurality of sensors whose output is combined to form a first track-crossing signal representative of movement across one or more of said plurality of tracks;
   a first comparator for receiving said first track-crossing signal and creating a first oscillating signal;
   a first up-down counter whose count direction is controlled by said first oscillating signal, said first up-down counter generating a first correction bias signal; and
   a proportional sampler providing a sampling strobe to said first up-down counter, said sampling strobe operable to adjust frequency of count operations in said first up-down counter based upon achieving a desired number of counts within a single full-track crossing.

9. The disc drive system of claim 8 wherein said first plurality of sensors comprises a plurality of photodiodes.

10. The disc drive system of claim 9 further comprising a CD-ROM pickup in which said plurality of photodiodes are disposed.

11. The disc drive system of claim 8 wherein said first oscillating signal has a variable duty cycle and said first correction bias signal is dependent upon said variable duty cycle.

12. The disc drive system of claim 11 further comprising:
   a summing junction disposed between said first plurality of sensors and said first comparator; and
   a first feedback loop for returning said first correction bias signal to said summing junction.

13. The disc drive system of claim 8 further comprising:
   a second plurality of sensors;
   a signal processing circuit coupled to said second plurality of sensors and generating a second track-crossing signal;
   a second comparator creating a second oscillating signal based upon said second track-crossing signal;
   a second up-down counter whose count direction is controlled by said second oscillating signal and whose frequency of count operations is controlled by said sampling strobe, said second up-down counter generating a second correction bias signal; and
   a second feedback loop for returning said second correction bias signal to said signal processing circuit.

14. The disc drive system of claim 8 further comprising a multi-clock generator coupled to said proportional sampler.

15. The disc drive system of claim 14 wherein said proportional sampler includes a multiplexer coupled to said multi-clock generator for selecting and outputting said sampling strobe.

16. The disc drive system of claim 15 wherein said proportional sampler further includes:
   a counter coupled to said multiplexer and receiving said sampling strobe, said counter generating a terminal count signal upon reaching said desired number of counts for a particular full-track crossing;
   a flip-flop coupled to said counter which records said terminal count when received at or before completion of said particular full-track crossing; and
   a third up-down counter, coupled to said flip-flop, for generating a selection signal based upon flip-flop contents, said selection signal used to control said multiplexer.

17. A method for dynamically adjusting a disc-drive pickup signal having a variable frequency comprising the steps of:

receiving the pickup signal;

incrementing a count value according to a sampling frequency while the pickup signal is above a predetermined threshold value;

decrementing the count value according to the sampling frequency while the pickup signal is below said predetermined threshold value;

periodically adjusting the sampling frequency based upon the variable frequency;

converting the count value to a correction bias signal; and modifying the pickup signal using said correction bias signal.

18. The method of claim 17 wherein the threshold value is fixed.

19. The method of claim 17 wherein the pickup signal oscillates in response to track crossings and the sampling frequency is adjusted after each full-track crossing.

20. The method of claim 19 wherein the sampling frequency adjustment step comprises the steps of:

determining whether a predetermined number of counts are performed during a particular full-track crossing;

increasing the sampling frequency when too few counts are performed; and decreasing the sampling frequency when too many counts are performed.

* * * * *